United States Patent [19]
Nakamura et al.

[11] Patent Number: 5,710,931
[45] Date of Patent: Jan. 20, 1998

[54] SUSPENSION STATE CONTROL FOR INFORMATION PROCESSING DEVICES SUCH AS BATTERY POWERED COMPUTERS

[75] Inventors: Atsushi Nakamura, Yokohama; Akihiko Hamamoto, Kawasaki; Shigehiro Kadota, Machida, all of Japan

[73] Assignee: Canon Kabushiki Kaisha, Tokyo, Japan

[21] Appl. No.: 523,239

[22] Filed: Sep. 5, 1995

[30] Foreign Application Priority Data

Sep. 7, 1994 [JP] Japan .................................. 6-239591
Jul. 13, 1995 [JP] Japan .................................. 7-199295

[51] Int. Cl.$^6$ .............................. G06F 1/26; G06F 1/32
[52] U.S. Cl. ...................... 395/750; 364/707; 364/492; 307/66
[58] Field of Search ........................... 395/750, 800; 364/707, 492; 365/227–229; 307/66; 340/661–663

[56] References Cited

U.S. PATENT DOCUMENTS

| | | | |
|---|---|---|---|
| 4,907,183 | 3/1990 | Tanaka | 364/707 |
| 5,021,983 | 6/1991 | Nguyen et al. | 364/707 |
| 5,167,024 | 11/1992 | Smith et al. | 395/375 |
| 5,230,056 | 7/1993 | Hoshina | 395/750 |
| 5,274,827 | 12/1993 | Haggerty et al. | 395/750 |
| 5,283,905 | 2/1994 | Saadeh et al. | 395/750 |
| 5,349,668 | 9/1994 | Gladstein et al. | 395/750 |
| 5,365,221 | 11/1994 | Fennell et al. | 340/636 |
| 5,519,871 | 5/1996 | Shimoda | 395/750 |

*Primary Examiner*—Gopal C. Ray
*Attorney, Agent, or Firm*—Fitzpatrick, Cella, Harper & Scinto

[57] ABSTRACT

An information processing apparatus according to the present invention stores suspension data in a non-volatile storage and performs a 0 V suspension process by which are turned off all power sources of the apparatus. An active suspension process is performed, by which are turned off power sources of the apparatus, excluding a power source that supplies power to the volatile storage. The 0 V suspension process is performed when a power supply voltage level is lower than a predetermined value, while the active suspension process is performed when that voltage level is higher than the predetermined level. The apparatus also predicts a processing time for a transfer unit and a power characteristic for a second storage unit. In addition, remaining power is detected using a reference value that is set at a first predetermined value in accordance with results obtained from the two predictions. The apparatus also has a storage unit that includes expanded memory areas, which are acquired by dividing available space into a plurality of blocks, and an expanded memory system, which has a plurality of page frames that are assigned to the blocks, and manages correspondence between the blocks and the page frames.

36 Claims, 22 Drawing Sheets

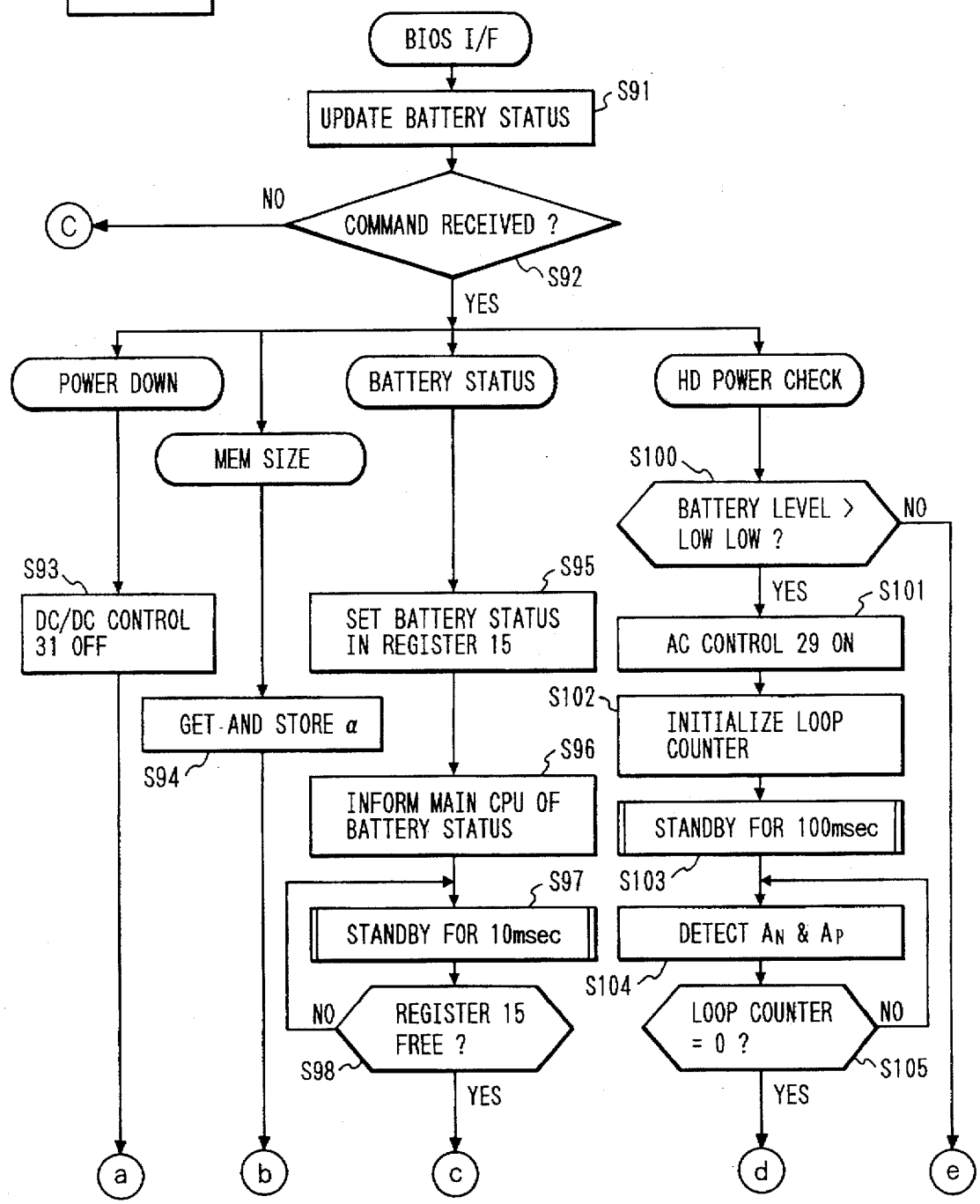

| Am (A) / Ap (A) | 0.2 | 0.4 | 0.6 | 0.8 | 1.0 |
|---|---|---|---|---|---|
| 0.2 | Lev1 | Lev1 | Lev2 | Lev2 | Lev3 |
| 0.4 | Lev2 | Lev2 | Lev3 | Lev4 | Lev4 |
| 0.6 | Lev3 | Lev3 | Lev4 | Lev4 | Lev5 |

FIG. 14

| α (MB) / β | 8 | 16 | 32 | 40 |
|---|---|---|---|---|
| Lev1 | 5% | 6% | 7% | 8% |
| Lev2 | 7% | 8% | 9% | 10% |
| Lev3 | 9% | 10% | 11% | 12% |
| Lev4 | 11% | 12% | 13% | 14% |
| Lev5 | 13% | 14% | 15% | 16% |

FIG. 15

| BATTERY LEVEL | HIGH | UPPER MIDDLE | LOWER MIDDLE | LOW | LOW LOW |
|---|---|---|---|---|---|
| DISCRIMINATION REFERENCE VALUE (Y) | 80% | 60% | 40% | 20% | γ% | ns
SUSPENSION STATE CONTROL FOR INFORMATION PROCESSING DEVICES SUCH AS BATTERY POWERED COMPUTERS

BACKGROUND OF THE INVENTION

2. Field of the Invention

The present invention relates to an information processing apparatus, and more particularly, to an information processing apparatus, such as a notebook personal computer (hereafter referred to a "notebook PC"), that has a suspension function that temporarily halts the supply of power as needed and a resume function that, when power is again supplied, immediately places the computer in the state in which it was before it was halted.

2. Related Background Art

Power-saving, battery-operable portable information processing apparatuses, such as notebook PCs, that have been developed and are available on the market incorporate a suspension function that temporarily halts the supply of power as needed so as to ensure the operation for an extended period of time.

As suspension functions, known are a 0 V suspension function that stores data in an internal memory into an external storage device, such as a hard disk, and then halts the supply of power to the memory; and a 5 V suspension function that supplies a minute amount of power to an internal memory to protect the data that are stored in the internal memory. As systems for shifting to a suspended state, known are a system wherewith a user voluntarily sets a suspended state by depressing a switch, etc., or by opening and closing a display panel; and a low-low suspension system that automatically sets a suspended state upon the detection of a reduction in the rate of the remaining battery capacity.

Further, currently there have also been developed other models of such portable information processing apparatuses, as well as desk-top personal computers, that include a higher speed computation processor and an internal memory or an external storage device that has an increased memory capacity.

When the low-low suspension is performed in a portable information processing apparatus, especially by the 0 V suspension process, a discrimination reference value (%), which is employed as a detection standard for the reduction in the rate of the remaining battery capacity, must be set to a value that enables all the data stored in an internal memory to be completely stored in an external storage device. That is, it is necessary for the portable information processing apparatus to at the least prevent the occurrence of a problem, in the transfer of data from the internal memory to the external storage device, that is due to the reduction of available consumed power during the suspension process. Another factor that must be taken in consideration is that a user may make repeated short-time use of the apparatus. Therefore, although the power that the portable information processing apparatus consumes differs with the modes that are used, the discrimination reference value (%) is set to a predetermined value (fixed value) that is acquired by assuming the maximum power will be consumed, and by allowing for a safety rate, and that provides an operating margin. When the rate of the remaining battery capacity is smaller than the discrimination reference value (%), the state is shifted to the suspended state and predetermined suspension processing is performed.

Since the data that are held in the internal memory are stored in the external storage memory by the 0 V suspension process, this system is superior for storing data. Further, as the power to the internal memory is halted, the service life of a battery is extended. However, as memory capacity is increased, suspension processing and resumption processing require more time.

FIG. 19 is a graph showing a current characteristic during the shift from the standby state, in which the operation of an external storage device is halted, up until the idle state, at which time reading and writing is possible, is reached at a constant-velocity rotation. A and B denote cases where the memory capacity of the external storage device is 200 MB, and C denotes a case where the memory capacity of the external storage device is 500 MB. For A and B, the disk rotational speed and the operation clock of the external storage memory are different, even though the memory capacities are identical.

As is shown in FIG. 19, the power that is consumed varies greatly depending on the memory capacity, the disk rotation speed, or the operation clock, and thus it is apparent that as the memory capacity is increased, there is a corresponding increase in the power consumption requirement.

FIG. 20 is a graph showing a relationship between the time required for suspension processing (0 V suspension) and the memory capacity of an internal memory.

As is apparent from FIG. 20, as the capacity of the internal memory is increased, the time required for the suspension processing is likewise increased, so that it is found that suspension processing is greatly affected by the memory size of the internal memory. Such a relationship between the power that is consumed and the time that is required can also be seen with resumption processing.

Under these conditions, when the discrimination reference value (%) is set following the above described requirements and 0 V suspension is performed by the low-low suspension system, the state is shifted to the suspended state even though the power remaining in the battery is still adequate. The remaining power rate (%) for the discrimination reference value (%) for the low-low suspension is generally set to about 18%, while, for example, the maximum power consumption is assumed and a safety rate is taken into consideration. When the state is shifted to the suspended state, the battery capacity of around 18% is remained. Therefore, a battery-operable portable information processing apparatus has a so-called memory effect phenomenon whereby not only is the processing period used by a battery shortened but the battery operating time on the appearance is also reduced due to the repetitive charging and discharging.

FIG. 21 is a discharge characteristic graph showing a relationship between a battery voltage (V) and time (t) while using a discrimination reference value (%) as a parameter. The horizontal axis indicates the time (t) and the vertical axis indicates the battery voltage (V). The broken line (b) represents a discharge characteristic when the discrimination reference value is 18%, while the solid line (a) represents a discharge characteristic when the discrimination reference value is 7%.

As is shown in FIG. 21, when, for example, the discrimination reference value (%) is set to 7% for the state that is used when consumed power is low, the battery voltage V is gradually and naturally reduced, as is indicated by the solid line (a). When the discrimination reference value is set to 18%, the charging and the discharging are repeated at around the value for 18%, which is the discrimination reference value, which results in the memory effect phenomenon whereby the battery voltage V is reduced by steps when the discharging is performed within a short period following the completion of the charging. Although a battery may have been used only several tens of cycles, a user may determine that the service life of the battery has expired and replace the battery, so that the battery is not effectively used.

In the 5 V suspension processing, since memory data are retained in the internal memory, the storage process of the memory data when executing the suspension processing is not required. Also, for the resumption processing, the memory data already exist in the internal memory, as is described above. Thus, accessing the suspension processing and the resumption processing can be performed at high speed. However, as power must be supplied constantly to retain the memory data that are stored in the internal memory, the service life of the backup battery is reduced. And when the suspended state is continued for an extended period of time, the power in the battery is dissipated and the memory data are erased.

As is described above, both the conventional 0 V suspension processing and the 5 V suspension processing have their negative and positive aspects when they are employed. A method is therefore desired whereby power can be saved more effectively, battery operating time can be extended longer, and suspension and resumption processing can be performed at higher speed.

SUMMARY OF THE INVENTION

To overcome the above described conventional problems, it is one object of the present invention to provide an information processing apparatus that can effectively utilize a suspension function, that can supply improved stability for data storing, and that can save on the power that is consumed.

It is another object of the present invention to provide a portable information processing apparatus that suppresses a memory effect phenomenon so as to extend a battery operating period, and that optimizes the consumption of power.

It is an additional object of the present invention to provide a portable information processing apparatus that executes suspension processing and resumption processing at a high speed so as to reduce required processing time, and that achieves low power consumption.

To achieve the above objects, according to the present invention, an information processing apparatus, which retains suspension data indicating a state in use immediately before the information processing apparatus is powered off, comprises:

power supply means for supplying a power voltage;
volatile storage means for storing data;
non-volatile storage means for the writing of data;
0 V suspension means for storing the suspension data in the non-volatile storage means and for performing a 0 V suspension process by which are turned off all power sources of the information processing apparatus;
active suspension means for performing an active suspension process by which are turned off power sources of the information processing apparatus, excluding a power source that supplies power to the volatile storage means; and
selection means for selecting the 0 V suspension process when a voltage level of the power supply means is lower than a predetermined value, and for selecting the active suspension process when the voltage level is higher than the predetermined level.

In addition, error determination means is included for determining whether or not there is an error occurs in the non-volatile storage means. It is preferable, when an error occurs in the non-volatile storage means, that the selection means select the active suspension process, even when the voltage level of the power supply means is lower than the predetermined value.

Further, memory presence determination means is provided for determining whether or not included with the non-volatile storage means is non-volatile semiconductor memory. When the non-volatile semiconductor memory is included, the 0 V suspension means may store the suspension data first in the non-volatile semiconductor memory.

Moreover, to achieve the above object, according to the present invention, a portable information processing apparatus comprises:

a battery for supplying power to an apparatus body;
first storage means for retaining data in a power supplied state;
second storage means for retaining data in a non-power supplied state;
transfer means for transferring the data stored in the first storage means to the second storage means while power is supplied;
first prediction means for predicting a processing time for the transfer means;
second prediction means for predicting a power characteristic for the second storage means;
remaining power detection means, for detecting a remaining power level for the battery, that includes reference value setting means for setting the first predetermined value in consonance with results obtained by the first and the second prediction means;
power supply halting means for, when the remaining power detection means determines that the remaining power level for the battery is lower than a first predetermined reference value, halting a supply of power upon completion of the transfer of the data by the transfer means.

Further, to achieve the above object, according to the present invention, a portable information processing apparatus comprises:

a battery for supplying power to an apparatus body;
first storage means, for retaining data in a power supplied state, that includes expanded memory areas that are acquired by dividing available space into a plurality of blocks and an expanded memory system that has a plurality of page frames that are assigned to the plurality of blocks, and that further includes expanded memory management means for managing correspondence between the plurality of blocks of the expanded memory areas and the page frames of the expanded memory system;
second storage means for retaining data in a non-power supplied state;
transfer means for transferring the data stored in the first storage means to the second storage means while power is supplied;
remaining power detection means for detecting a remaining power of the battery; and
power supply halting means for, when the remaining power detection means determines that the remaining power level of the battery is lower than a first predetermined reference value, halting a supply of power upon completion of the transfer of the data by the transfer means.

BRIEF DESCRIPTION OF THE DRAWINGS

FIG. 14 is a diagram showing a variable reference value selection table;

FIG. 15 is a diagram showing a battery table discrimination table;

Figure 1:
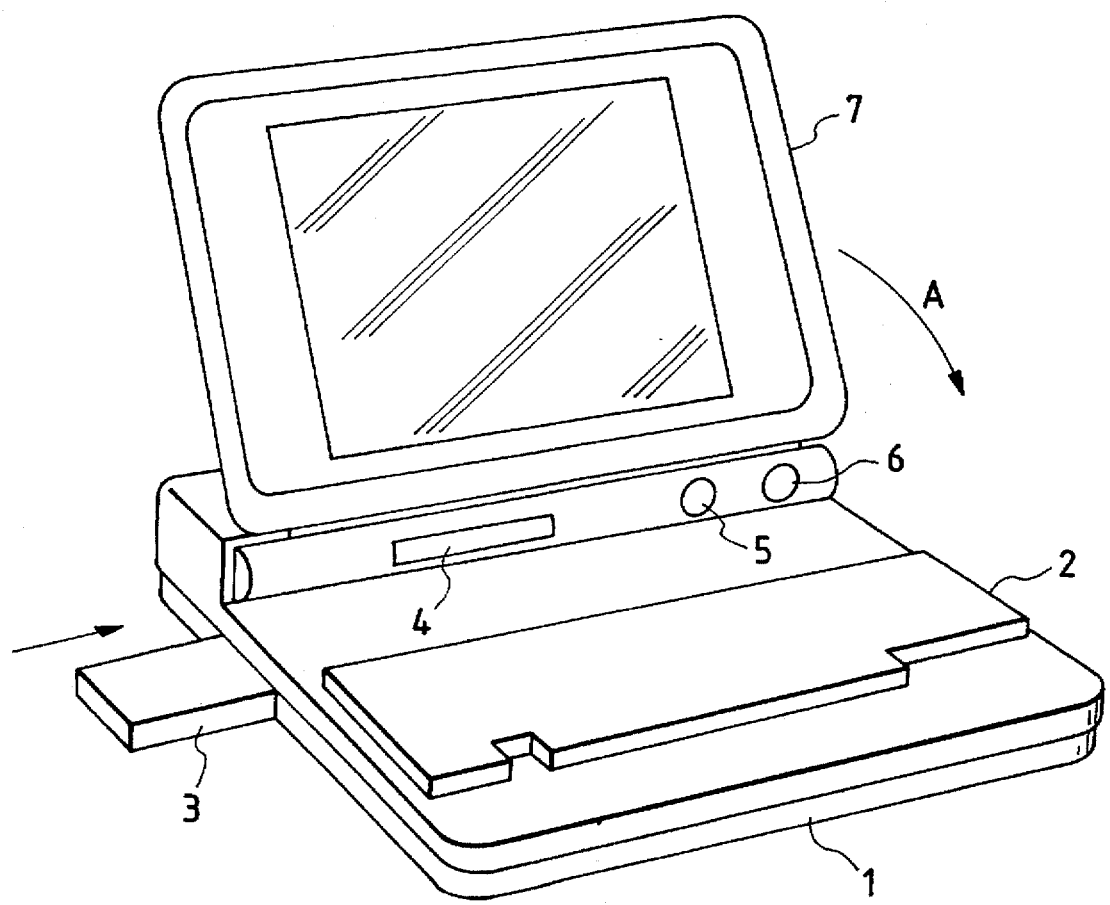
FIG. 1 is a diagram illustrating the outline of a notebook personal computer as a portable information processing apparatus according to a first embodiment of the present invention.

DETAILED DESCRIPTION OF THE PREFERRED EMBODIMENTS (First Embodiment)

The preferred embodiments of the present invention will now be described while referring to the drawings.

FIG. 1 is a diagram illustrating the outline of a notebook PC as a portable information processing apparatus according to one embodiment of the present invention. In the notebook PC, a keyboard 2 is provided in the lower section of a PC body 1, and a battery pack 3, which has a plurality of secondary chargeable batteries for supplying power to the PC body 1, is loaded into the side face of the PC body 1.

The battery pack 3 is designed with a smart battery that incorporates a so-called one-chip microcomputer. The rate (%) of the remaining battery capacity and the remaining operation time for the PC body 1 are calculated periodically, and the results of the calculations are displayed on a compact liquid crystal display panel (small LCD) 4.

A light-emitting diode (LED) 5 is on while the battery pack 3 is being charged, and is turned off when the charging has been completed.

When a power switch 6 is depressed in a power-on state or in a suspended state, the PC body 1 is set to the operational state. Further, this state of the PC body 1 is shifted to the suspended state when the power switch 6 is depressed (short-on) for a predetermined period of time (e.g., two seconds), while the operational state is shifted to the power-off state when the power switch 6 is depressed (long-on) for a period that is longer than the predetermined time (e.g., two seconds).

A liquid crystal display panel (LCD) 7 is freely opened and closed in the direction indicated by the arrow A. A contact sensor (not shown) is provided in a rotational portion for opening and closing the LCD 7. Power management (PM) in a setup menu is so set that, when the LCD 7 is closed while the PC body 1 is in the operational state, the state of the PC body 1 can be shifted to the suspended state, and when the PC body 1 is in the suspended state following the closing of the LCD 7, the state of the PC body 1 can be shifted to the operational state by opening the LCD 7. An AC adaptor can be inserted into the rear portion of the PC body 1 of the notebook PC.

Figure 2:
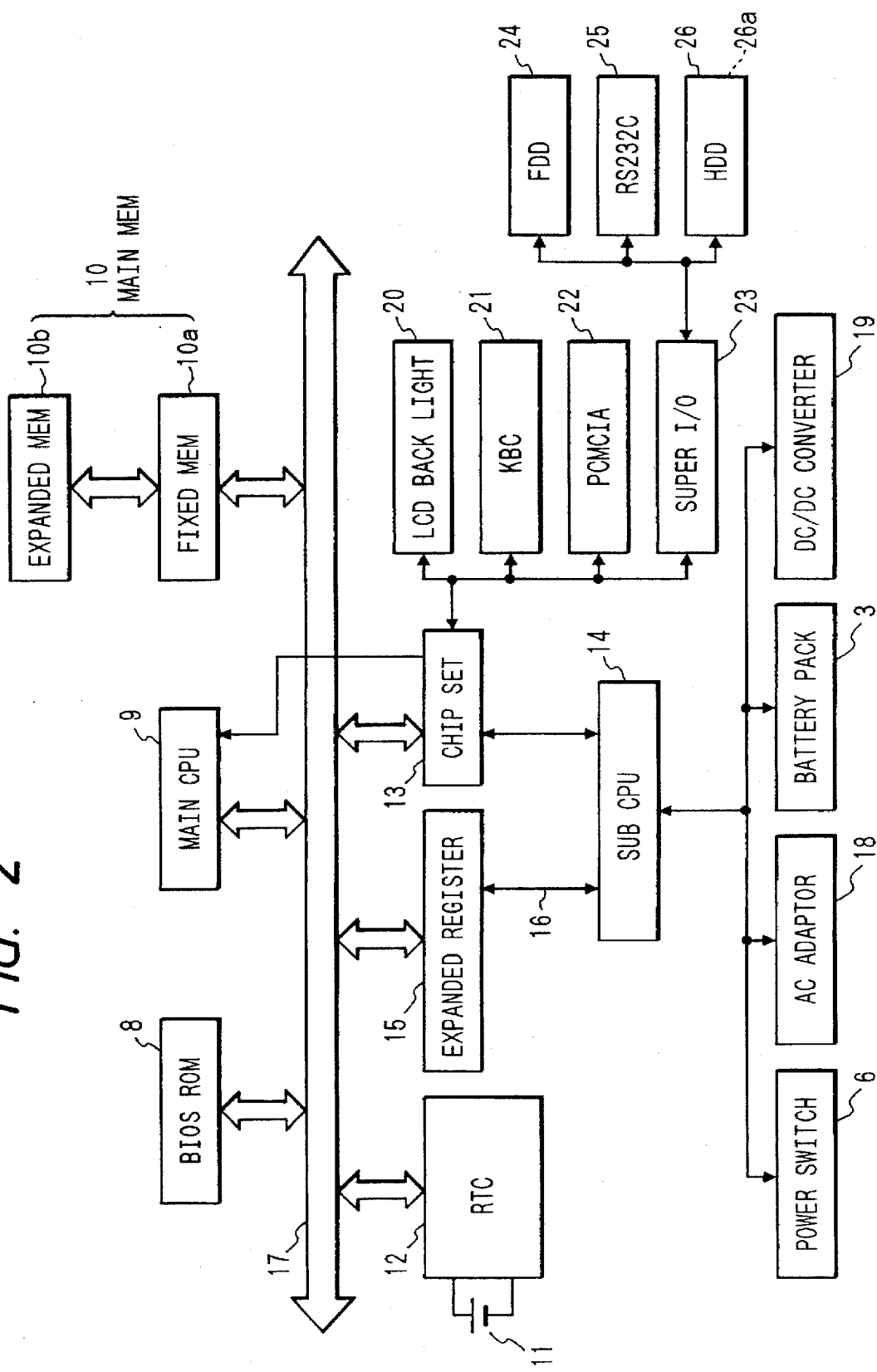
FIG. 2 is a block diagram illustrating the internal arrangement of the notebook personal computer.

FIG. 2 is a block diagram illustrating a control system within the notebook PC. The control system of the notebook PC comprises a ROM (hereafter referred to as a "BIOS ROM") 8, in which a basic input/output system (BIOS) is stored; a main CPU 9, which controls the entire system of the apparatus; an internal main memory 10, in which various input data are stored; an RTC 12, which employs a compact battery 11 to backup setup data, boot strap data (hereafter referred to as "boot data"), etc., even in the power-off state; a chip set 13, which primarily controls the power of various input/output units (I/O units); a sub-CPU 14, which mainly controls a power supply system; and an expanded register 15, which is employed for exchange data between the sub-CPU 14 and the main CPU 9. The expanded register 15 and the sub-CPU 14 are mutually connected by a data/control signal line 16. The BIOS ROM 8, the main CPU 9, the internal main memory 10, the RTC 12, the chip set 13, and the expanded register 15 are mutually connected by a system bus 17 that conforms to ISA (Industry Standard Architecture) standards design.

More in detail, to the CPU 14 are connected the power switch 6, an AC adaptor 18, the battery pack 3, and a DC/DC converter 19. Under the control of the sub-CPU 14, the DC/DC converter 19 converts an input voltage from the battery pack 3 into a desirable output voltage and both supplies power to the main CPU 9 and halts the supply of power.

To the chip set 13 are connected a backlight 20 for the LCD 7, a keyboard controller (KBC) 21 that controls the keyboard 2, a PCMCIA 22, and a super I/O 23. The super I/O 23 is connected to a floppy disk drive (FDD) 24, an RS232C interface 25, and a hard disk drive (HDD) 26.

The internal memory 10 is constituted by a fixed memory 10a (for example, an 8 MB memory capacity (hereafter referred to as a "memory size")), which is fixed to the board of the PC body 1, and an expanded memory 10b (for example, 32 MB of memory size), such as a detachable SIMM (Single In-line Memory Module) for memory expansion. For the internal main memory 10, therefore, in addition to the fixed memory 10a, an arbitrary expanded memory 10b that has a desirable memory capacity can be provided. In this embodiment, the memory size of the internal main memory 10 is employed as an important factor in the determination of the low-low level of the battery pack 3, which will be described later.

In this embodiment, in addition to the expanded memory 10b, the main CPU 9 and the HDD 26 are also detachable, and can be replaced to obtain computation speed and a memory capacity that are in consonance with the desires of a user.

Figure 3:
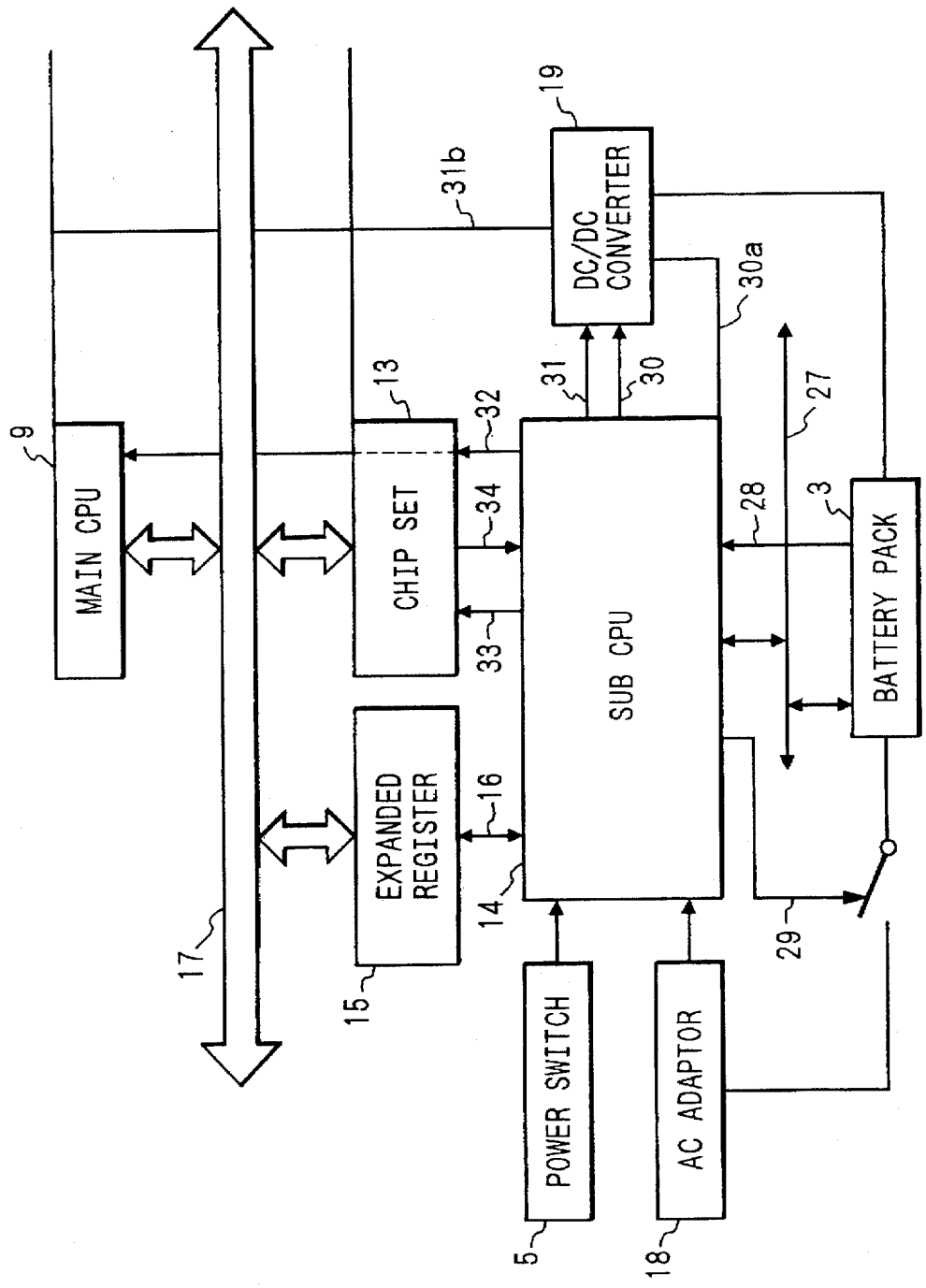
FIG. 3 is a block diagram illustrating the arrangement of the essential section of the notebook computer.

FIG. 3 is a detail diagram showing the essential section in FIG. 2. The battery pack 3 transmits, as environmental data, the battery status (the power remaining, the operation time remaining, current and voltage charged and discharged, a temperature, etc.) to the sub-CPU 14 via the bus 27. A battery voltage, especially, is constantly monitored by the sub-CPU 14 across a voltage signal line 28. An AC control signal line 29 from the sub-CPU 14 is employed to connect the AC adaptor 18 to the battery pack 3. More specifically, when an ON signal is sent from the sub-CPU 14 across the AC control signal line 29, the AC adaptor 18 is connected to the battery pack 3, and the sub-CPU 14 determines that the AC adaptor is present (ACON). When an OFF signal is sent from the sub-CPU 14 across the AC control signal line 29, the AC adaptor 18 is disconnected from the battery pack 3, and the sub-CPU 14 determines that the AC adaptor 14 is absent (ACOFF).

The ON/OFF state of a sub-CPU power line 30a is controlled by the DC/DC converter 19 in consonance with a signal that is transmitted from the sub-CPU 14 across a power signal line 30. The ON/OFF state of a main CPU power line 31b is controlled by the DC/DC converter 19 in consonance with a signal that is transmitted from the sub-CPU 14 across a DC/DC control signal line 31.

In addition, a system management interrupt signal (hereafter referred to as an "SMI signal") is transmitted from the sub-CPU 14 via the chip set 13 across an SMI signal line 32 to the main CPU 9. The sub-CPU 14 is connected to the chip set 13 across several control signal lines. More specifically, a suspend request (SUSREQ) can be transmitted from the sub-CPU 14 to the chip set 13 across a SUS control signal line 33. A SYSOFF signal can be forwarded from the main CPU 9 via the chip set 13 across a SYSOFF control signal line 34 to the sub-CPU 14. When a high level SYSOFF signal from the main CPU 9 has been received by the sub-CPU 14 across the SYSOFF control signal line 34, the sub-CPU 14 issues an OFF command for the main CPU power line 31b to the DC/DC converter 19 across the DC/DC control signal line 31 to render the main CPU 9 inactive. When a low level SYSOFF signal from the main CPU 9 has been received by the sub-CPU 14, the sub-CPU 14 issues an ON command for the main CPU power line 31b to the DC/DC converter 19 across the DC/DC control signal line 31 to render the main CPU 9 active.

Figure 4:
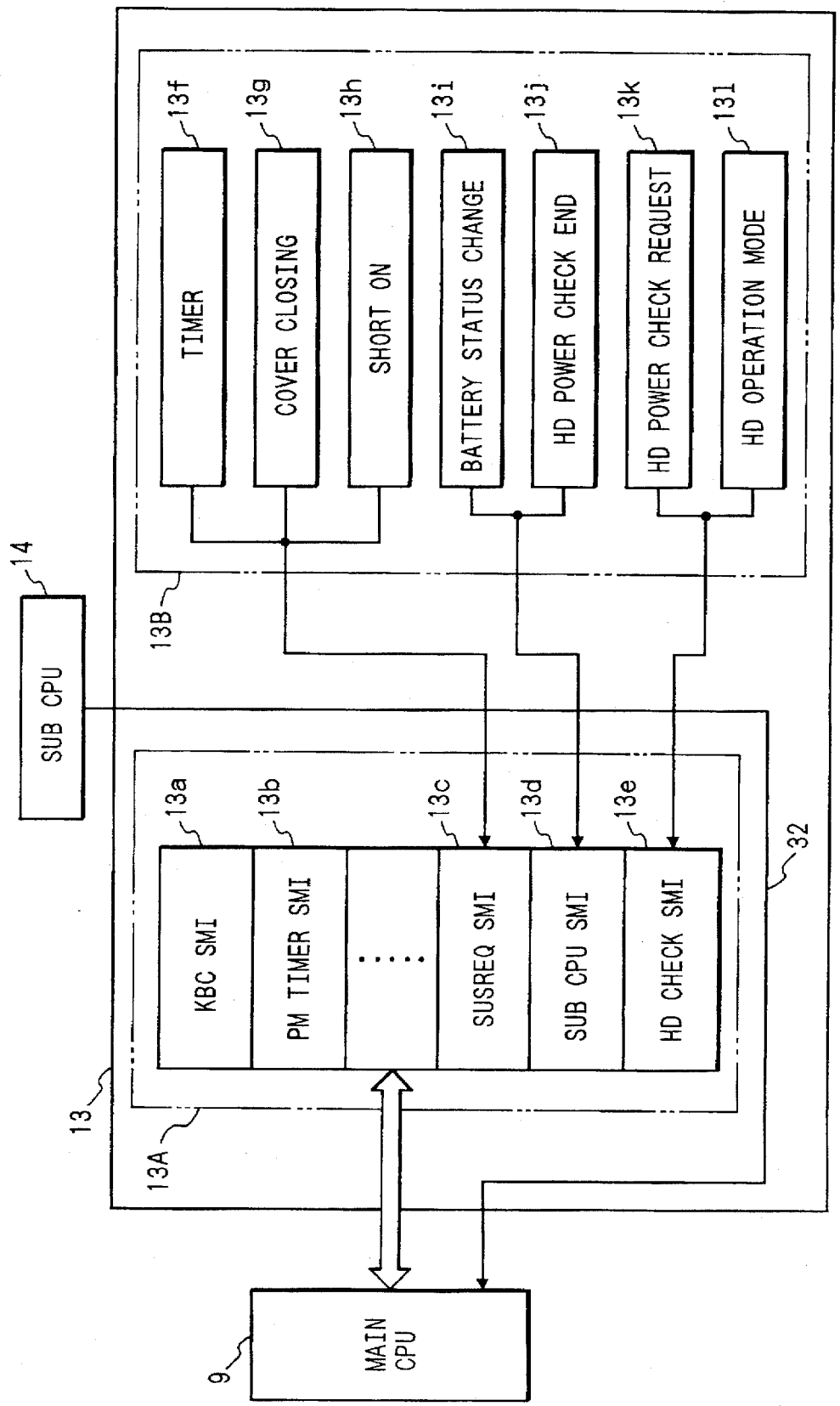
FIG. 4 is a detailed block diagram illustrating the arrangement of a chip set.

FIG. 4 is a specific diagram illustrating the internal arrangement of the chip set 13.

The chip set 13 includes an SMI source register group 13A, in which are stored bit data for various system management interrupt signals (KBC SMI, PM timer SMI, SUSREQ SMI, sub-CPU SMI, HD check SMI, etc.), and an interrupt enabling signal group 13B that supplies various interrupt enabling data to the SMI source register group 13A. Bit data for either a high level signal or a low level signal are stored in individual source registers (a KBC SMI source register 13a, a PM timer SMI source register 13b, a SUSREQ SMI source register 13c, a sub-CPU SMI source register 13d, and HDD check SMI source register 13e) in the SMI source register group 13A. The bit data for a high level signal renders the state active and the bit data for a low level signal renders the state inactive. The source registers 13a through 13e are connected to the SMI signal line 32 from the sub-CPU 14 via a logical sum circuit (OR circuit). When either the bit data in the source registers 13a through 13e or the bit data for the SMI signal are for high level signal, an interrupt signal is supplied to the main CPU 9.

A timer signal 13f is transmitted to supply interrupt enabling data to the SUSREQ SMI source register 13c while the PC body 1 is in the non-operational state a specific time. A lid-closed signal 13g is sent to supply an interrupt enabling signal to the SUSREQ SMI source register 13c when the notebook PC is closed and in the non-operational state. Further, a short ON signal 13f is transmitted to supply interrupt enabling data to the SUSREQ SMI source register 13c when the power switch 6 has been depressed for a predetermined time (for example, two seconds) in the operational state.

When the battery state is changed, the data bits in a battery status change register 13i are set for a high level signal and interrupt enabling data are supplied to the sub-CPU SMI source register 13d. When the sub-CPU 14 has terminated an HD power check, which will be described later, the data bits in an HD power check register 13j are set for a high level signal and interrupt enabling data are supplied to the sub-CPU SMI source register 13d. In the sub-CPU SMI source register 13d that has received one or more of these interrupt enabling data signals, the data bits are set for a high level signal and are transmitted to the main CPU 9. At this time, the status that the sub-CPU has set in the expanded register 15 is acquired. The main CPU sets a command in the expanded register 15, and the sub-CPU detects the presence of the command by polling and executed a predetermined command process.

When the main CPU 9 has confirmed a certain rate of remaining battery power during system boot processing, which will be described later, the bit data in HD power check request register 13k are set for a high level and interrupt enabling data are transmitted to the HD check SMI source register 13e. When the state is shifted from a standby state, where the rotation of an HD 26a is halted by the HDD 26, to the idle state, where reading and writing can be performed, the bit data in an HD operation mode register 13l are set for a high level signal and interrupt enabling data are transmitted to the HD check SMI source register 13e. The HD power check request register 13k and the HD operation mode register 13l are connected to each other by a logical product circuit (AND circuit). When the bit data in both register are set for high level signals and are transmitted, the bit data in the HD check SMI source register 13e is set for a high level signal and is then transmitted to the main CPU 9. That is, when there is no access of the HD 26a within a specific period following the setting of the bit data in the HD power check request register 13k for a high level signal, the state of the PC is shifted to the suspended state according to the PM setup, the rotation of the HD 26a is halted, and the state of the PC is changed to the standby state. When an access of the HD 26a occurs, the HD 26a begins rotating, the state is changed from the standby state to the idle state, and the bit data in the HD check SMI source register 13e is set for a high level signal and is transmitted to the main CPU 9.

Figure 5:
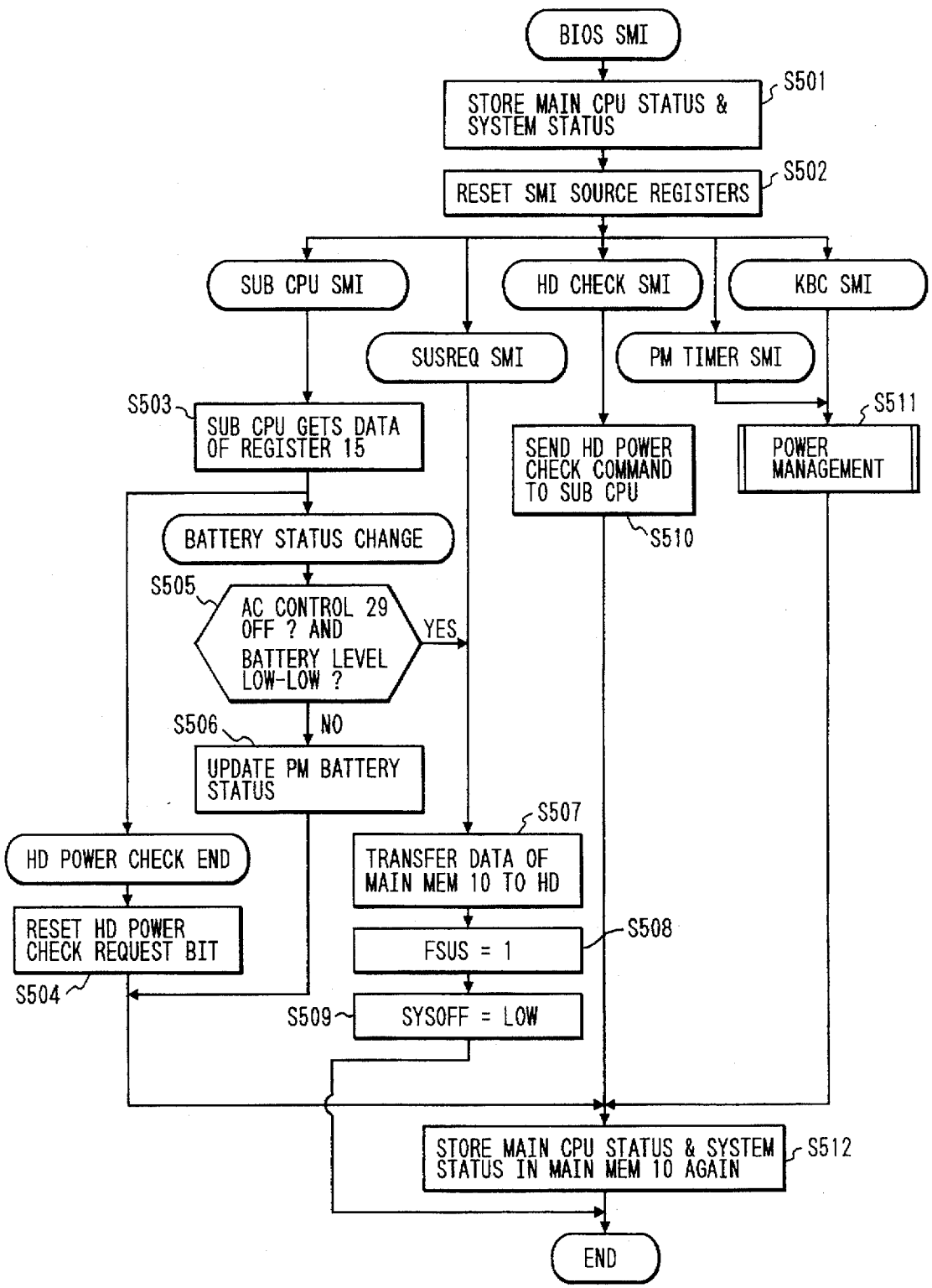
FIG. 5 is a flowchart showing BIOS SMI processing.

FIG. 5 is a flowchart showing BIOS SMI processing that is performed by the main CPU 9 when each SMI signal is transmitted from the chip set 13 to the main CPU 9.

At step S501, the status of the main CPU 9 and the system status are stored in the internal main memory 10. Then, all the bit data in the SMI source register group 13A of the chip set 13 are reset for low level signals to set the inactive state (step S502). When the interrupt enabling data are transmitted from the interrupt enabling signal group 13B to the SMI source register group 13A, the bit data in the corresponding source register 13a to 13e are converted into high level signals (active state), an SMI signal is transmitted to the main CPU 9, and the processing is thus performed.

Figure 10B:
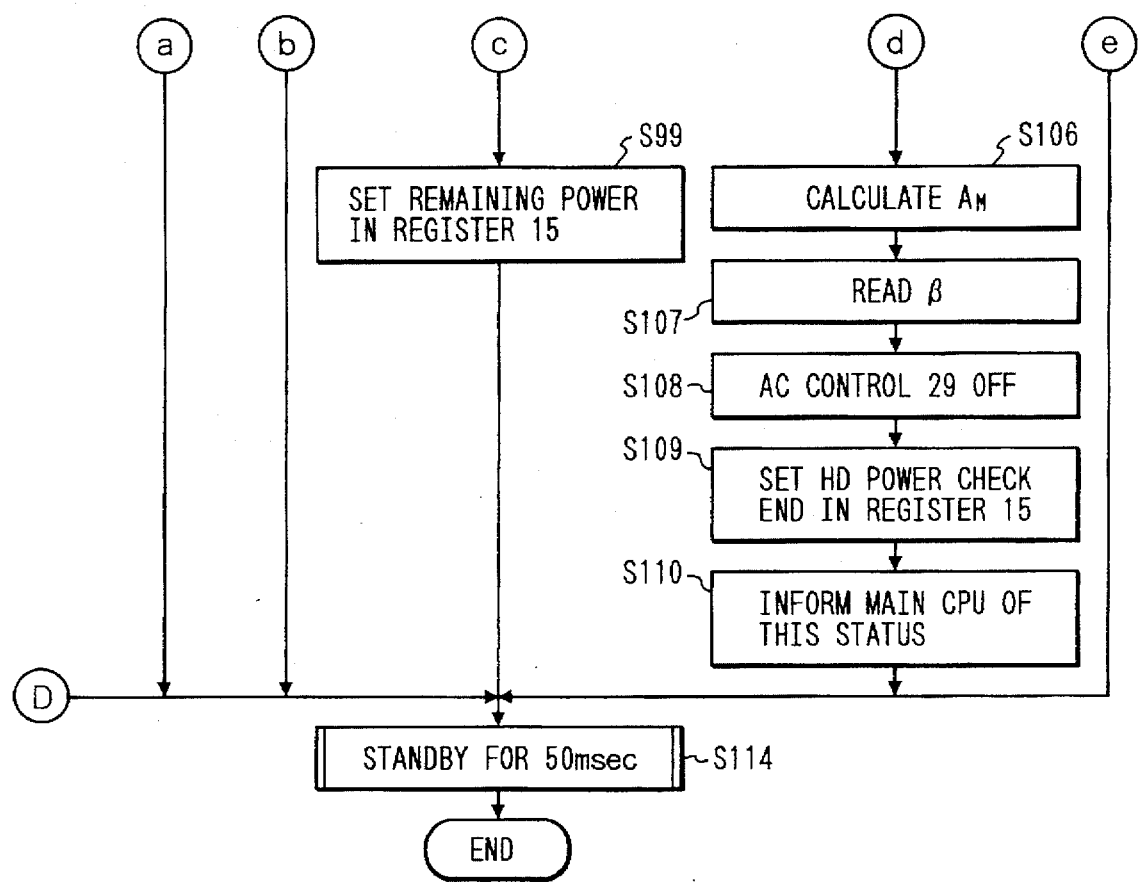
FIG. 10 which is comprised of FIGS. 10A and 10B is a flowchart (½) showing the procedures for a BIOS I/F task.

More specifically, when there is a change in the status of the battery, or the execution of an HD power check command is completed in a BIOS I/F task (FIGS. 10A to 11) that is performed by the sub-CPU 14, which will be described later, the sub-CPU 14 acquires the content of the expanded register 15, i.e., the change in the status of the battery or the completion of the execution of the HD power check command (step S503). When the content of the expanded register 15 is the completion of the HD power check, the bit data of the HD power check request register 13k is reset to the inactive state (step S504), and program control moves to step S512. Hereafter the state of the bit data in the HD power check request register 13k is not rendered active until the bit data is converted into a high level signal during boot processing, which will be described later, and accordingly, the HD check SMI source register 13e is not rendered active. In other words, the HD power check is performed only once during the first operation after the boot processing is performed.

When the content of the expanded register 15 is the change in the status of the battery, a check is performed to determine whether or not the AC control signal 29 is an OFF signal and whether or not a battery level indicating the rate of the remaining battery power is a low-low level (step S505). In this embodiment, the battery level is classified according to five steps that correspond to the remaining battery power: a high level, an upper middle level, a lower middle level, a low level, and a low-low level. The discrimination reference value Y for a high level, an upper middle level, a lower middle level, and a low level is defined as a fixed reference value, while the discrimination reference value Y for a low-low level is defined as a variable reference value γ (calculated during a battery remaining power detection task in FIG. 13, which will be described later). When the decision at step S505 is affirmative (Yes), program control moves to step S507, where 0 V suspension processing that will be described later is performed. When the decision at step S505 is negative (No), the status of the battery that is managed by the PM setup is updated (step S506), and program control goes to step S512.

When the sub-CPU 14 detects that a short-ON is performed for the power switch 6, and when the LCD 7 is closed and not opened within a specific period, the bit data in the SUSREQ SMI source register 13c is set for a high level signal (active state), and the 0 V suspension processing at step S507 and the following steps is performed.

At step S507, the data in the internal main memory 10 are transferred to the HD 26a, and a 0 V suspension flag FSUS that is located in a boot data area of the RTC 12, in which the data are held by the compact battery 11 even during the 0 V suspension processing, is set to "1" (step S508). When the suspension processing is terminated, the 0 V suspension flag FSUS is set to "1", and when the resumption processing is terminated, the 0 V suspension flag FSUS is reset to "1". Program control then advances to step S509, where the SYSOFF signal is set to a low level signal. The BIOS SMI processing is thereafter terminated. Through this processing, the sub-CPU 14 renders the main CPU power line 31b active across the DC/DC control signal line 31 via the DC/DC converter 19 to permit the system control of the notebook PC in this embodiment.

When the bit data in the HD power check request register 13k is set for a high level signal (active state), and then when the operation mode of the HD 26a is shifted from the standby state to the idle state by an instruction from an HDC (hard disk controller; not shown) and the bit data in the HD operation mode register 131 is set for a high level signal, the bit data in the HD check SMI source register 13e is set for a high level signal (active state). At step S510, an HD power check command is transmitted to the sub-CPU 14 to activate an HD power check in the BIOS I/F task, which will be described later, and program control goes to step S512.

When the bit data in the KBC SMI source register 13a and in the PM timer SMI source register 13b are set for high level signals (active states), well known power management processing is performed (step S511) and program control advances to step S512.

At step S512, the statuses of the main CPU 9 and the system that are stored at step S501 are stored again in the internal main memory 10 and retrieved, and the SMI processing is thereafter terminated. Then, the processing that is halted during the execution of the SMI processing is resumed.

The system boot processing that is executed by the main CPU 9 will now be described in detail.

Figure 6:
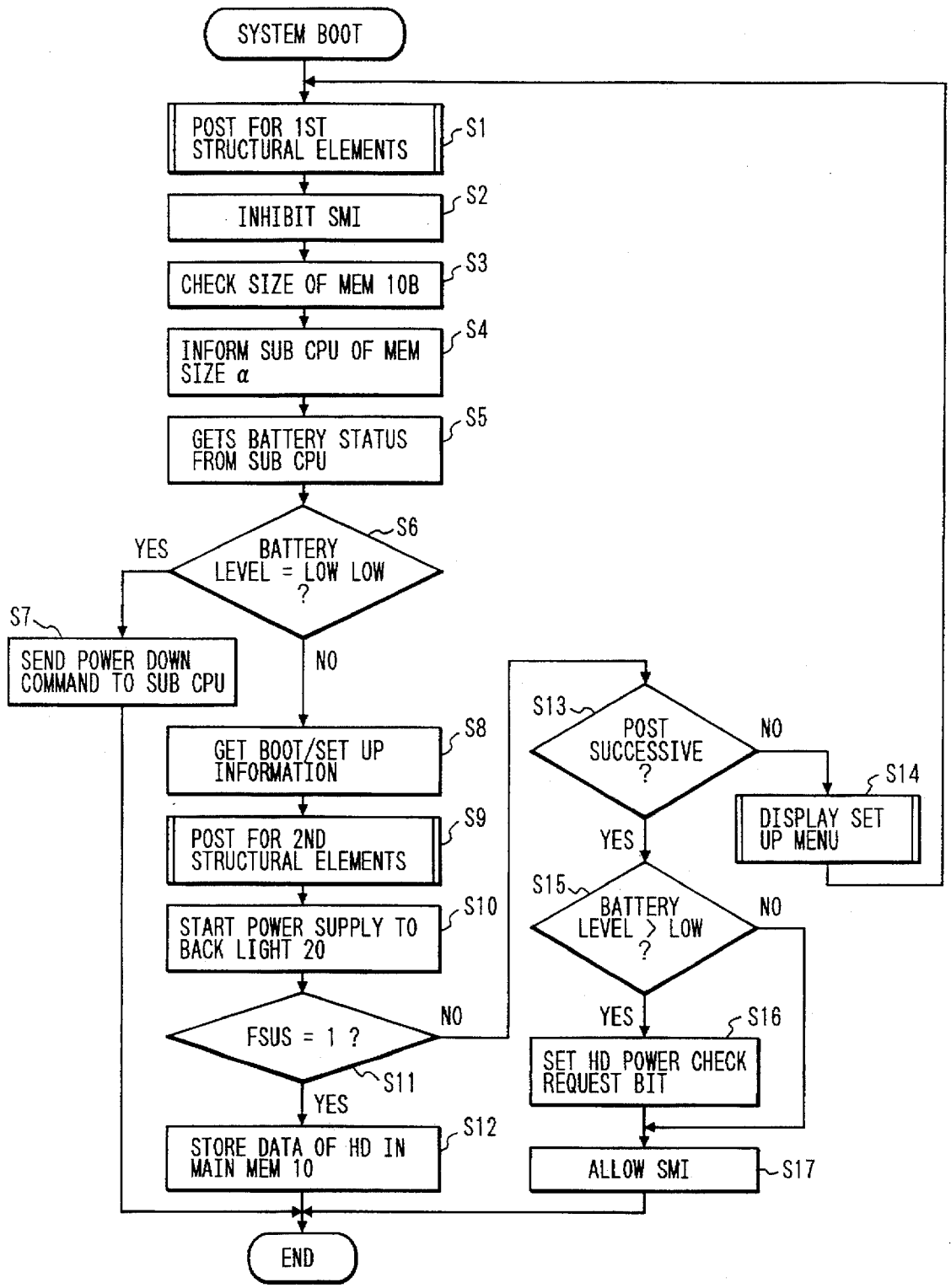
FIG. 6 is a flowchart showing system boot processing.

FIG. 6 is a flowchart showing the system boot processing. While power is not supplied to the main CPU 9, the sub-CPU 14 detects the depression of the power switch 6 and power is then supplied to the main CPU 9 across the DC/DC control signal line 31. Then, the main CPU 9 reads the program for the system boot processing from the BIOS ROM 8 and executes it.

First, at step S1, POST (Power On Self Test) processing is performed for the main CPU 9 and the first component group that can not be removed from the PC body 1. In other words, the initialization test for the main CPU 9, the display test for the LED 5, the reading and writing test for the fixed memory 10a, and the initialization test for the FDD 24 are performed. Then, at step S2, interrupts that are initiated by SMI signals are disabled. At step S3, the memory size of the expanded memory 10b is examined, and the total memory size α of the internal main memory 10 is reported to the sub-CPU 14 via the expanded register 15 (step S4). The time required for the suspension processing is related to either the processing speed and the operation clock of the main CPU 9 or the rotation speed of the HD 26a. However, as is described in the Related Background Art, the memory size α has a great influence on the processing time, and is employed during the remaining battery power detection task processing, which will be described later, to determine the variable reference value γ that will be a discrimination reference value of the low-low level.

Following this, at step S5, the main CPU 9 acquires the battery status of the battery pack 3 from the sub-CPU 14 via the expanded register 15. At step S6, a check is performed to determine whether or not the battery level that indicates the remaining battery capacity, which is one of the determiners for establishing the battery status, is a low-low level. If the decision is affirmative (Yes), program control moves to step S7, since during the execution of the system boot processing the battery capacity may be reduced and the power supply to the main CPU 9 may be halted. At step S7, a power down command is sent to the sub-CPU 14 through the expanded register 15. The processing is thereafter terminated.

If the decision at step S6 is negative (No), i.e., when the status of the battery level is such that the system boot processing can be performed, boot data and setup data that are stored with backups in the RTC 12 are acquired (step S8). As mentioned previously, the boot data includes the 0 V suspension flag FSUS, which is set to "1" when the 0 V suspension processing is terminated. More specifically, when the 0 V suspension flag FSUS has been set to "1", the current boot processing is resumption processing that is performed to recover from the 0 V suspension state. When the 0 V suspension flag FSUS has been reset to "0", the current boot processing is normal boot processing. The setup data include the types of the FDD 24 and the HDD 26 and their connection data, data for the system arrangement, such as the storage capacity of the FDD 24, and power management setups for various input/output sections that are connected to the chip set 13.

At step S9, in consonance with the setup data, the POST processing is performed for the second component group, excluding the main CPU 9, that can be detached, i.e., for the expanded memory 10b and the HDD 26. The power supply to the backlight 20 of the LCD 7 is begun via the chip set 13 (step S10).

At step S11, a check is performed to determine whether or not the 0 V suspension flag has been set to "1". When the decision is affirmative (Yes), the current boot processing is the resumption processing that is performed to recover from the 0 V suspension. The data that are stored in the HD 26a immediately before the suspension is performed are transferred to and stored on the internal main memory 10 (step S12). The resumption processing to recover from the 0 V suspension is thereafter terminated.

When the decision at step S11 is negative (No), at step S13 a check is performed to determine whether or not the POST process at step S1 or S9 has been successfully performed. If the decision is negative (No), i.e., when an error has occurred in the POST process, the setup menu is displayed on the LCD 7 to request a user to restart the setup (step S14). Program control thereafter returns to step S1 and the above processing is repeated.

If the decision at step S13 is affirmative (Yes), i.e., when the normal boot processing can be executed, a check is performed to determine whether or not the battery level is higher than a low level (step S15). When the decision is negative (No), program control goes to step S17. When the decision at step S15 is affirmative (Yes), i.e., when a certain amount of the remaining battery capacity is confirmed, the bit data in the HD power check request register 13k is set for a high level signal to render its state active (step S16). Then, the bit data in the HD check SMI source register 13e is set for a high level signal to render its state active, and the SMI signal is transmitted to the main CPU 9 (step S17). The system boot processing by the BIOS is thereafter terminated. Following this, boot processing by an OS (operation system) will be performed for which no explanation will be given here.

Various control processes that are related to power supply and that are executed by the sub-CPU 14 will now be explained in detail.

Figure 7:
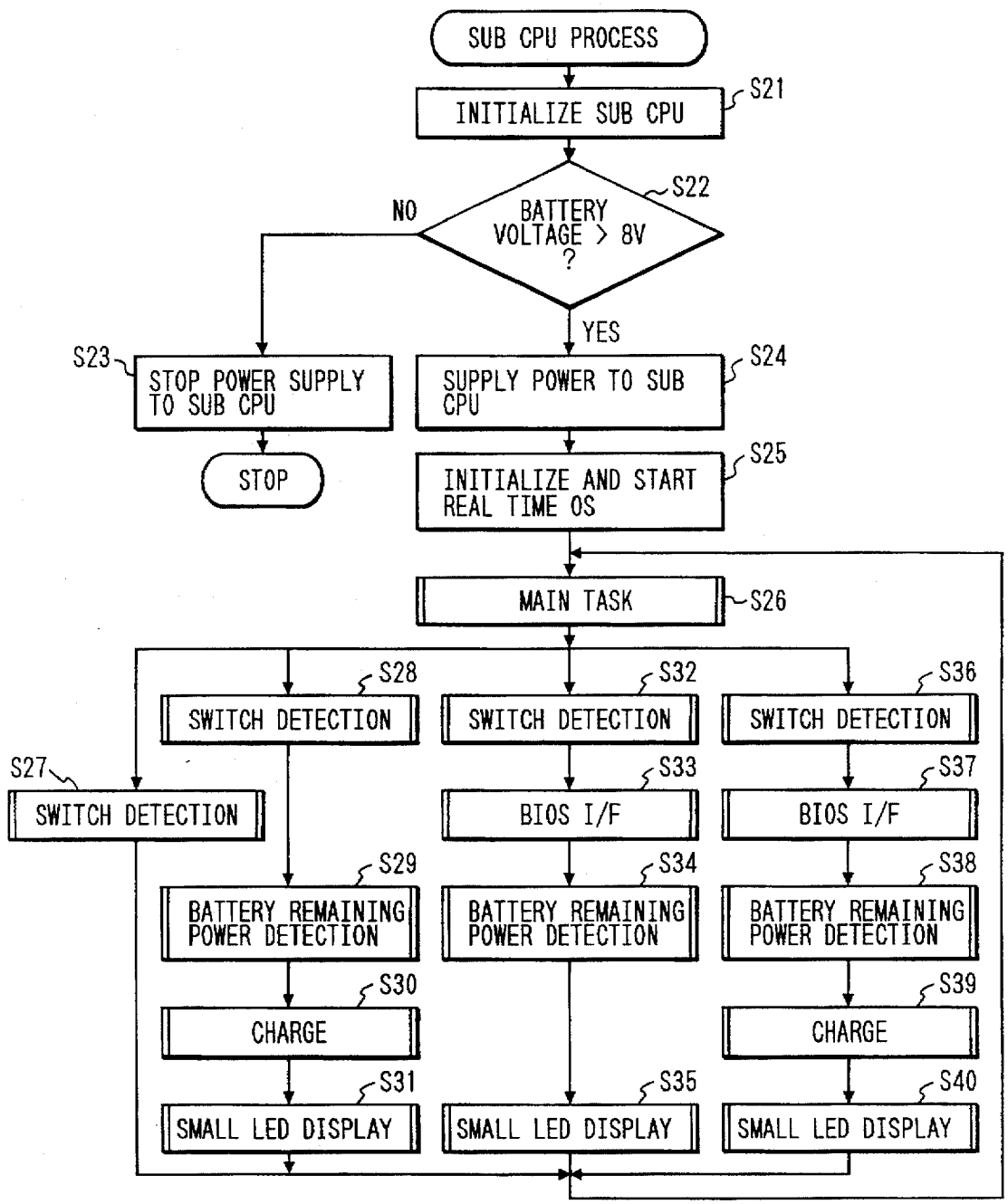
FIG. 7 is a flowchart showing the control processing performed by a sub-CPU.

FIG. 7 is a flowchart showing all the control procedures that are performed by the sub-CPU 14.

When, for example, the battery pack 3 is loaded into the PC body 1, power is unconditionally supplied to the sub-CPU 14 through the DC/DC converter 19 across the sub-CPU power line 30a for a predetermined time (for example, 50 msec). At step S21, the sub-CPU 14 is initialized and a check is then performed to determine whether a battery voltage V is greater than 8 V (step S22). If the decision is negative (No), i.e., when the battery voltage V is equal to or lower than 8 V, it is concluded that if the sub-CPU 14 is continuously operated the battery pack 3 will be over discharged and its service life will be reduced. Thus, the power signal line 30 is rendered inactive, and the supply of power from the DC/DC converter 19 to the sub-CPU power line 30a is halted (step S23). All the loads are removed from the power supply.

When the decision at step S22 is affirmative (Yes), power is supplied to the sub-CPU 14 through the DC/DC converter 19 across the sub-CPU power line 30a (step S24). The sub-CPU 14 initializes and starts a real time OS that conforms to μITRON (step S25). Then, the procedures of the main task are performed (step S26).

The sub-CPU 14 has four operational states, as is shown in Table 1, that are determined in consonance with the presence or absence of the AC adaptor 18 and the state of the SYSOFF signal along the SYSOFF control signal line 34. Tasks that are to be performed vary in consonance with the operational state.

TABLE 1

| | Signal State | Operational State |
|---|---|---|
| 1 | ACOFF & SYSOFF [high] | Adaptor absent, 0 V Suspension |
| 2 | ACON & SYSOFF [high] | Adaptor present, 0 V Suspension |
| 3 | ACOFF & SYSOFF [low] | Adaptor absent, Active State |
| 4 | ACON & SYSOFF [low] | Adaptor present, Active State |

The main task is performed for all the states in common, with the selection of the four operational states and the initiation and the termination of subordinate tasks being functions of the main task.

More specifically, for case 1 above, since the AC adaptor 18 is absent, it is assumed that the battery pack 3 is not loaded, and the operational state is the 0 V suspended state. At this time, only a switch detection task is performed to determine the depression of the power switch 6 and its depression duration (step S27). Program control then returns to step S26.

For case 2, the adaptor 18 is present and thus the battery pack 3 is determined to be loaded, while the operational state is the 0 V suspended state. At this time, it is necessary for the remaining battery power of the battery pack 3 to be detected so as to provide for the charging of the battery pack 3 as needed or so that the presence or the absence of the AC adaptor 18 and the remaining battery power can be displayed on the small LCD 4. Therefore, the switch detection task (step S28), the remaining battery power detection task (step S29), the charging task (step S30) and the small LED display task (step S31) are performed adequately, and program control then returns to step S26. The charging task is controlled so that the charging is carried out while the control of the AC adaptor 18 and the control of the battery pack 3 are included functions of the charging task.

For case 3, since the AC adaptor 18 is absent, it is assumed that the battery pack 3 is not loaded, and in the active state, power is supplied to the main CPU 9 of the system. After the switch detection task is performed (step S32), the BIOS I/F task is performed so as to exchange data concerning the BIOS with the main CPU 9 (step S33). Then, the remaining battery power detection task (step S34) and the small LED display task (step S35) are performed as needed, and program control returns to step S26.

For case 4, the AC adaptor 18 is present and it is therefore concluded that the battery pack 3 is loaded. In addition, power is supplied to the main CPU 9 on the system side. In this case, the switch detection task (step S36), the BIOS I/F task (step S37), the remaining battery power detection task (step S38), and charging task (step S39) and the small LED display task (step S40) are appropriately performed and program control returns to step S26.

The main task functions will now be explained in detail.

Figure 8:
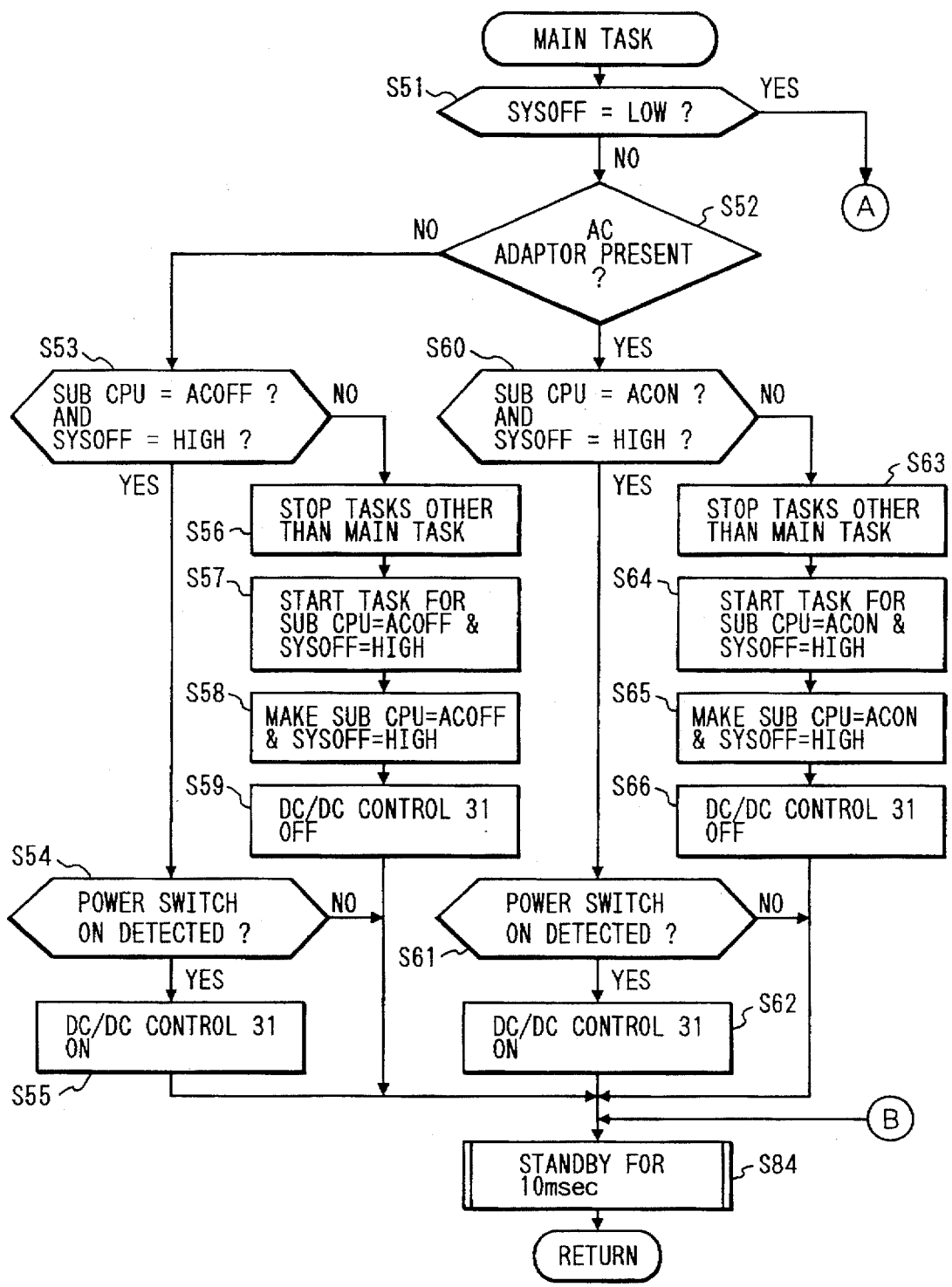
FIG. 8 is a flowchart (½) showing the procedures of a main task.
Figure 9:
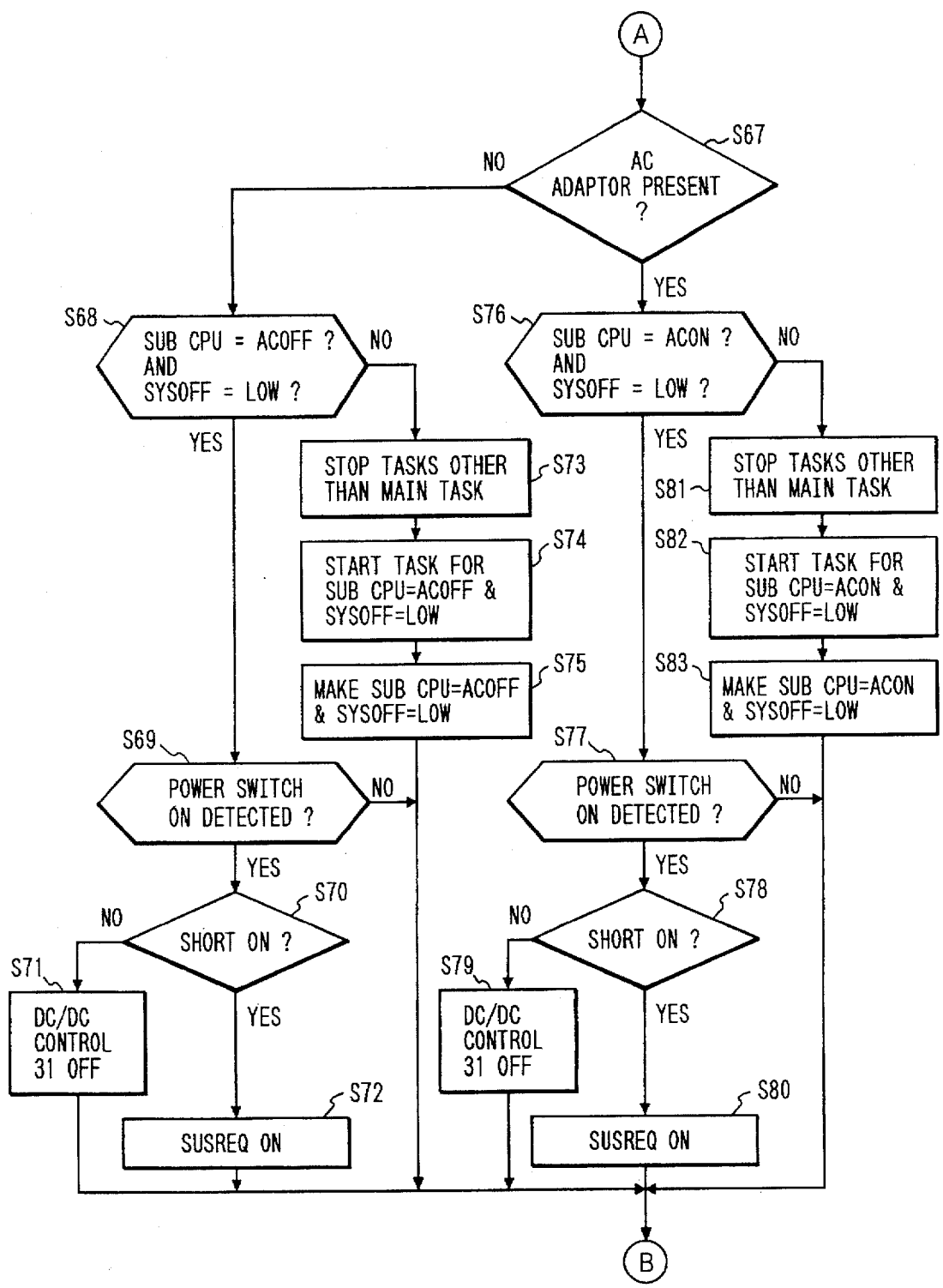
FIG. 9 is a flowchart (2/2) showing the procedures for the main task.

FIGS. 8 and 9 are flowcharts showing the control procedures of the main task. The sub-CPU 14 is held in one of the four operational states to maintain its own internal state.

In FIG. 8, at step S51 a check is performed to determine whether or not the SYSOFF signal is a low level signal. When the decision is negative (No), i.e., when the SYSOFF signal is a high level signal, a check is performed to determine whether or not the AC adaptor 18 is present (step S52). If the decision is negative (No), that is, when the SYSOFF signal is a high level signal and the AC adaptor 18 is absent, i.e., when the signal state is ACOFF & SYSOFF [high], a check is performed to determine whether or not the current internal state of the sub-CPU 14 is ACOFF & SYSOFF [high] (step S53). If the decision is affirmative (Yes), i.e., when an input signal and the internal state of the sub-CPU 14 match, a check is performed to determine whether or not the depression of the power switch 6 and its depression duration have been detected by the switch detection task (step S54). When the depression of the power switch 6 within a predetermined period has not been detected, program control moves to step S84. When depression within the predetermined period of time has been detected, the DC/DC control signal line 31 is rendered active by the DC/DC converter 19 in order to begin to supply power to the main CPU 9 (step S55). Program control then goes to step S84.

If the decision at step S53 is negative (No), i.e., when an input signal and the internal state of the sub-CPU 14 differ, that is, when there is a change in the internal state, the execution of all the tasks but the main task that is currently being executed is halted (step S56). And a task that is appropriate for the input signal, i.e., a task that is suitable for a signal state of ACOFF & SYSOFF [high], specifically, the switch detection task in this case, is begun (step S57). The internal state of the sub-CPU 14 is set to ACOFF & SYSOFF [high] (step S58), and the DC/DC control signal line 31 is rendered inactive by the DC/DC converter 19 to cut off the power supply to the main CPU 9 (step S59). Program control then moves to step S84.

If the decision at step S52 is affirmative (Yes), i.e., when the signal state is ACON & SYSOFF [high], a check is performed to determine whether or not the current internal state of the sub-CPU 14 is ACON & SYSOFF [high] (step S60). When the decision is affirmative (Yes), i.e., when an input signal and the internal state of the sub-CPU 14 match, a check is performed to determine whether or not the depression of the power switch 6 has been detected by the switch detection task (step S61). When no depression within a predetermined period of time has been detected, program control moves to step S84. When a depression within a predetermined period of time has been detected, the DC/DC control signal line 31 is rendered active by the DC/DC converter 19 to begin to supply power to the main CPU 9 (step S62). Program control then goes to step S84.

If the decision at step S60 is negative (No), that is, when an input signal and the internal state of the sub-CPU 14 differ, i.e., when there is a change in the internal state, the execution of all the tasks but the main task that is currently being executed is halted (step S63). And a task that is suitable for the input signal, i.e., the process at steps S28 through S31 in FIG. 7, is appropriately begun (step S64). The internal state of the sub-CPU 14 is set to ACON & SYSOFF [high] (step S65), and the DC/DC control signal line 31 is rendered inactive by the DC/DC converter 19 to cut off the power supply to the main CPU 9 (step S66). Program control then goes to step S84.

If, the decision at step S51 is affirmative (Yes), i.e., when the SYSOFF signal is a low level signal, program control moves to step S67 in FIG. 9. A check is then performed to determine whether or not the AC adaptor 18 is present. If the decision is negative (No), that is, when the SYSOFF signal is a low level signal and the AC adaptor 18 is absent, i.e., when the signal state is ACOFF & SYSOFF [low], a check is performed to determine whether or not the current internal state of the sub-CPU 14 is ACOFF & SYSOFF [low] (step S68). If the decision is affirmative (Yes), i.e., when an input signal and the internal state of the sub-CPU 14 match, a check is performed to determine whether or not the depression of the power switch 6 has been detected by the switch detection task (step S69). When depression of the power switch 6 has not been detected, program control moves to step S84. When switch depression has been detected, a check is performed to determine whether or not the depression duration exceeded a predetermined time, i.e., whether or not the depression is a short-on (for example, two seconds or shorter) (step S70). When the decision is negative (No), i.e., when the depression is a long-on (longer than two seconds), the DC/DC control signal line 31 is rendered inactive by the DC/DC converter 19 to halt the supply of power to the main CPU 9 (step S71). Program control then goes to step S84.

When the decision at step S70 is affirmative (Yes), it is assumed that a user intends to temporarily halt the work and to resume the work by performing suspension processing. A SUSREQ signal is transmitted from the SUSREQ SMI source register 13c in the chip set 13 to the main CPU 9 (step S72). Program control then moves to step S84 (FIG. 8).

If the decision at step S68 is negative (No), i.e., when an input signal and the internal state of the sub-CPU 14 differ, the execution of all the tasks but the main task that is currently being executed is halted (step S73), and tasks at steps S32 through S35 in FIG. 7 that are suitable for ACOFF & SYSOFF [low] are appropriately begun (step S74). The internal state of the sub-CPU 14 is set to ACOFF & SYSOFF [low] (step S75).

If the decision at step S67 is affirmative (Yes), i.e., when the signal state is ACON & SYSOFF [low], a check is performed to determine whether or not the current internal state of the sub-CPU 14 is ACON & SYSOFF [low] (step S76). When the decision is affirmative (Yes), i.e., when an input signal and the internal state of the sub-CPU 14 match, a check is performed to determine whether or not depression of the power switch 6 has been detected by the switch detection task (step S77). When switch depression has not been detected, program control moves to step S84. When switch depression has been detected, a check is performed to determine whether or not the depression is a short-on (for example, two seconds or shorter) (step S78). When the decision is negative (No), i.e., when the depression is a long-on (longer than two seconds), the DC/DC control signal line 31 is rendered active by the DC/DC converter 19 to begin to supply power to the main CPU 9 (step S79). Program control then goes to step S84.

If the decision at step S78 is affirmative (Yes), the SUSREQ signal is transmitted from the SUSREQ SMI source register 13c in the chip set 13 to the main CPU 9 (step S80). Program control then moves to step S84.

If the decision at step S76 is negative (No), the execution of all the tasks but the main task that is currently being executed is halted (step S81), and a task that is suitable for ACON & SYSOFF [high], i.e., specifically, the process at steps S36 through S40 in FIG. 7, is appropriately begun (step S82). The internal state of the sub-CPU 14 is set to ACON & SYSOFF [low] (step S83). Program control then goes to step S84.

At step S84 (FIG. 8), the task control is performed by the real time OS during the 10 msec standby and a resource use right is switched to another task. The main task is thereafter terminated.

Figures 11, 12:
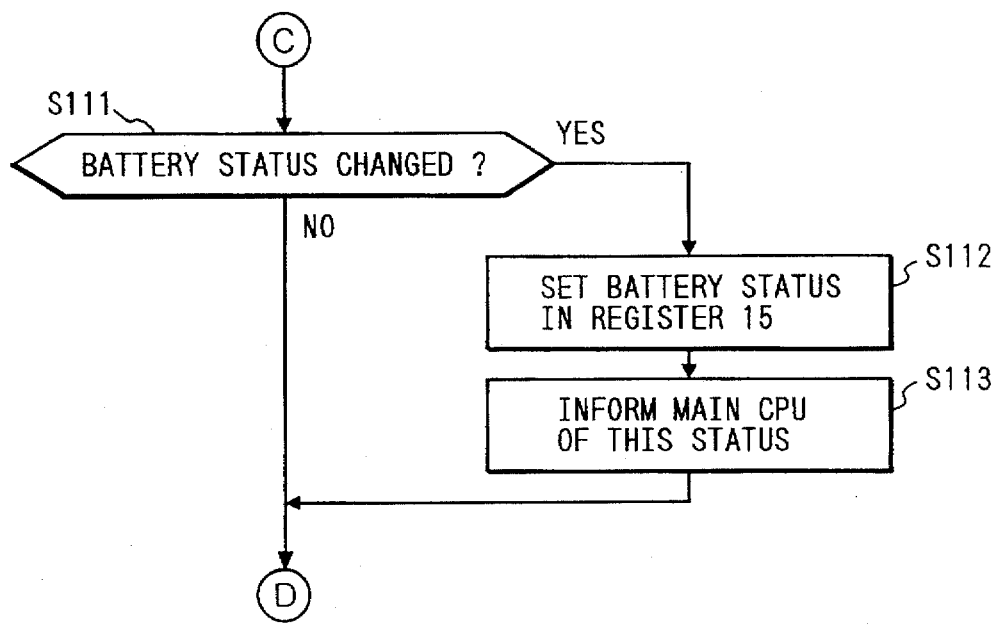
FIG. 11 is a flowchart (2/2) showing the procedures for the BIOS I/F task.
FIG. 12 is a diagram showing a power level selection table.

FIGS. 10A to 11 are flowcharts showing the control procedures for the BIOS I/F task. During the execution of the BIOS I/F task, the latest data for the battery level of the battery pack 3 and the presence or the absence of the AC adaptor 18, which are reported to the main CPU 9, are usually retained in advance.

At step S91, the battery status is updated in consonance with the presence or the absence of the AC adaptor 18 and the battery level. At step S92, a check is performed to determine whether or not a command has been received. When a command has been received and that command is a power-down command (when, at step S7 in FIG. 6, a power-down command is transmitted to the sub-CPU 14), the DC/DC control signal line 31 is rendered inactive by the DC/DC converter 19 to halt the supply of power to the main CPU 9 (step S93). Program control then goes to step S114.

If the command received by the sub-CPU 14 is a memory-size notice command, the sub-CPU 14 sends to the main CPU 9 an acknowledgement that it has received the memory-size notice command, and memory size α is stored in the expanded register 15 (step S94). Program control then moves to step S114.

If the command received by the sub-CPU 14 is a battery status command, the battery status that is updated at step S91 is set in the expanded register 15 (step S95), and the effect is reported to the main CPU 9 (BIOS) (step S96). Then, 10 msec standby processing is executed (step S97). Following this, a check is performed to determine whether or not the main CPU 9 has obtained the battery status and the expanded register 15 is now free again (step S98). If the decision is affirmative (Yes), the rate (%) of the remaining battery power is set in the expanded register 15 (step S99) and program control goes to step S114.

When the command received by the sub-CPU 14 is an HD power check command, a check is performed to determine whether or not the battery level that is updated at step S91 is higher than a low-low battery level (step S100). As is described above, when the HDD 26 is accessed the first time after the system boot processing in FIG. 6 is terminated, the HD power check command is transmitted by the main CPU 9 in response to the SMI signal that is transmitted as a trigger from the chip set 13. When the decision at step S100 is negative (No), program control moves to step S114. When the decision is affirmative (Yes), the AC control signal line 29 is rendered active and the power supply for the notebook PC is forcibly changed to the battery pack 3 (step S101). A loop counter (100 loops in 100 msec) for measuring the battery status for ten seconds is initialized (step S102). After the 100 msec standby (step S103), the discharged current value An (updated during a 50 msec cycle) and its peak current value Ap are detected (step S104). At step S105, a check is performed to determine whether or not a value held by the loop counter has become "1". When the decision is negative (No), the process at steps S103 through S105 is repeated. Then, the average current value Am of the discharged current values An that were measured 100 times in 10 seconds is calculated (step S106). The power level selection table is examined and the power characteristic β is read out (step S107).

In the power level selection table, as is shown in FIG. 12, power levels (Lev1, . . ., Lev5) are set according to the average current values Am (0.2 A, 0.4 A, 0.6 A, 0.8 A and 1.0 A) and the peak current values Ap (0.2 A, 0.4 A and 0.6 A). The power characteristic β is read out by examining the power level selection table, or is calculated by interpolation. At step S108, the AC control signal line 29 is rendered inactive, and the power supply is switched to the power switch 6 side. The HD power check end is set in the expanded register 15 (step S109). This status is reported to the main CPU 9 by the SMI signal (step S110), and program control advances to step S114.

If the decision at step S92 is negative (No), i.e., when a command is not received, a check is performed to determine whether or not the battery status is changed (step S111). When the decision is negative (No), program control goes to step S114. When the decision is affirmative (Yes), the latest battery status is set in the expanded register 15 (S112). This status is reported to the main CPU 9 by the SMI signal (step S113), and program control goes to step S114.

At step S114, the task control is performed by a real time OS during the 50 msec standby, and a resource use right is switched to another task. The BIOS I/F task is thereafter terminated.

Figure 13:
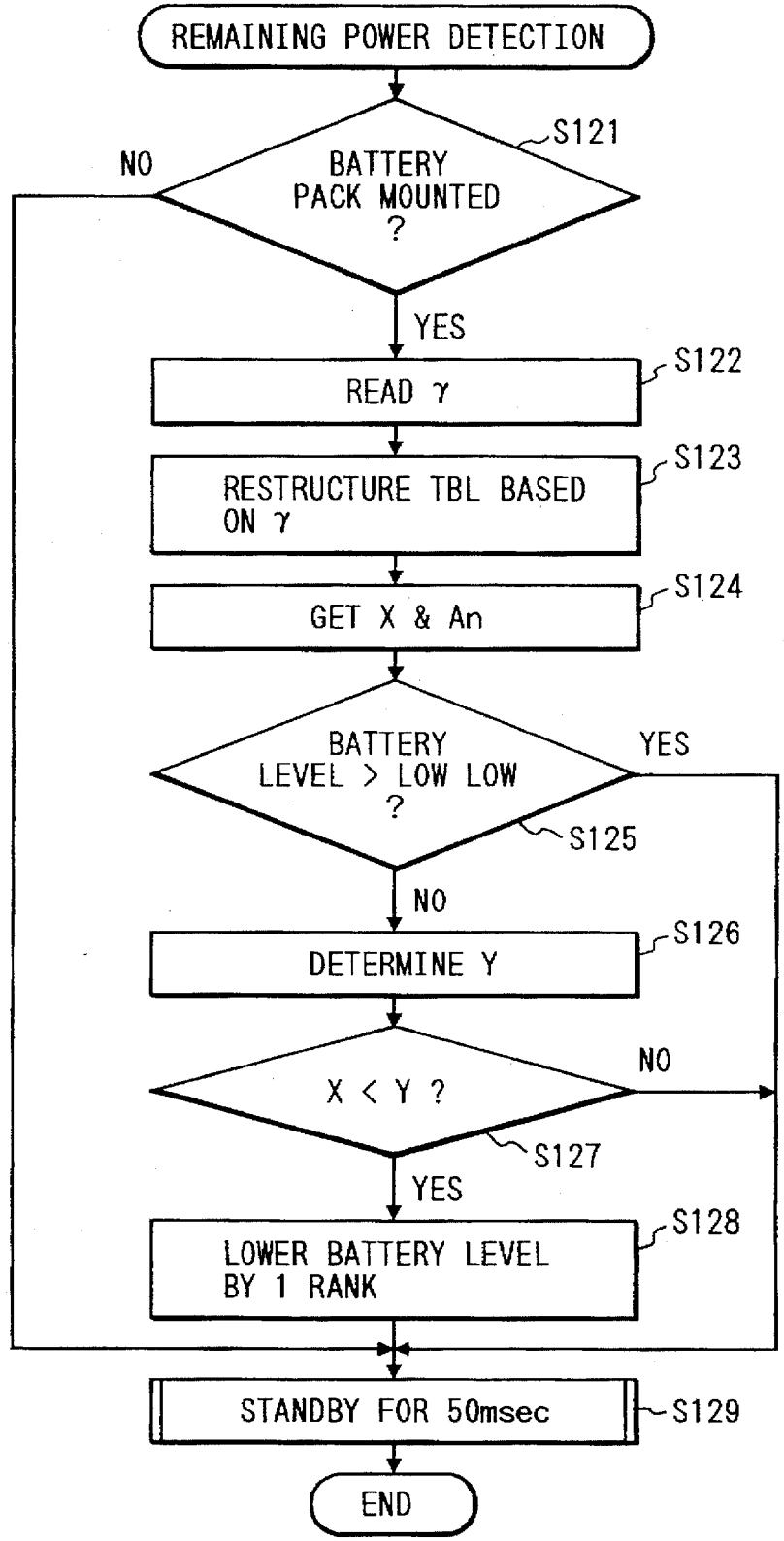
FIG. 13 is a flowchart showing the procedures for a battery remaining power detection task.

FIG. 13 is a flowchart showing the control procedures for the remaining battery power detection task.

At step S121, a check is performed to determine whether or not the battery pack 3 is loaded into the PC body 1. If the decision is negative (No), program control moves to step S129. If the decision is affirmative (Yes), a variable reference value selection table is examined to read out the variable reference value γ, which is the discrimination reference for the low-low level.

In the variable reference value selection table, as is shown in FIG. 14, the rate of the remaining battery power is set for the memory size α (MB) (8, 16, 32 and 40) of the internal main memory 10 and the power characteristic β (Lev1, ., Lev5). The variable reference value γ is read out by searching the variable reference value selection table or is calculated by interpolation. More specifically, the discrimination reference values for the high level, the upper middle level, etc., except for the low-low level, are fixed values. If the discrimination reference value for the low-low level at which the battery remaining power is extremely low is also a fixed value, some user inconvenience may result because the battery operating time is extremely reduced due to a mode that is used. In this embodiment, therefore, the discrimination reference value for the low-low level is determined in consonance with the power characteristic β, which is calculated from the consumed current at a battery level that is higher than the low-low level, and the memory size α in order to extend both the battery operating time and the service life of the battery.

The memory size α is set to 8 MB and the power characteristic β is set to Lev2 in the initialization of the sub-CPU 14. These initial values are employed before the above described BIOS I/F task (FIGS. 10A to 11) concerning the HD power check command is performed.

At step S123, the battery level determination table (TBL) is restructured in accordance with the variable reference value γ.

At step S124, via the bus 27 the sub-CPU 14 acquires a current rate X of the remaining battery power of the battery pack 3 and a current discharged current value An, and stores these updated values in a RAM (not shown). The discharged current value An is referred to in the BIOS I/F task processing in FIGS. 10A and 10B that is performed upon the receipt of the HD power check command.

At step S125, a check is performed to determine whether or not the battery level is a low-low level. If the decision is affirmative, program control moves to step S129. If the decision is negative (No), the battery level determination table TBL is searched to calculate the discrimination reference value Y (step S126).

At step S127, the remaining battery power rate X is compared with the discrimination reference value Y. When the remaining battery power rate X is greater than the discrimination reference value Y, program control advances to step S128. When the remaining battery power rate X is smaller than the discrimination reference value Y, it is assumed that the remaining battery power is low and the battery level is reduced one step. Program control then advances to step S129.

At step S129, the task control is performed by a real time OS during the 50 msec standby, and a resource use right is switched to another task. The battery remaining power detection task is thereafter terminated.

In this embodiment, an explanation has been given for a case where data that are stored in the internal main memory 10 are transferred to the HD 26a via the HDD 26. The present invention is not limited to the HD and the HDD, and any device that can hold the stored data in the no power supply state may be employed. For example, data in the internal memory 10 may be transferred to an FD via the FDD 24. A photomagnetic disk and a compact disk for writing data can be used in the same manner.

Further, in this embodiment, the time required for suspension processing is determined by referring to the memory size of the internal main memory 10. The time required for suspension processing can be predicted more accurately in accordance with either one of, or both of, the computation speed of the main CPU 9 and the disk rotation speed of the HD 26a.

In addition, in this embodiment, the sub-CPU 14 controls the system as it relates to the supply of power to reduce the load on the main CPU 9. However, when a main CPU 9 that has a sufficiently high processing speed is employed, the main CPU 9 can take the place of the sub-CPU 14 to perform one or all of the controls, such as power characteristic determination processing, that are performed by the sub-CPU 14.

In the resumption processing for the notebook PC in this embodiment, the contents of the HD 26a are merely transferred to the internal main memory 10 in order and are stored therein. To increase processing speed, as is shown in FIG. 16A, the fixed memory 10a of the internal main memory 10 may be divided into a standard memory area 51 and an expanded memory area 52, and page frames, as is shown in FIG. 16B, may be allocated to the expanded memory area 52 to perform suspension and resumption processing.

Figure 16A:
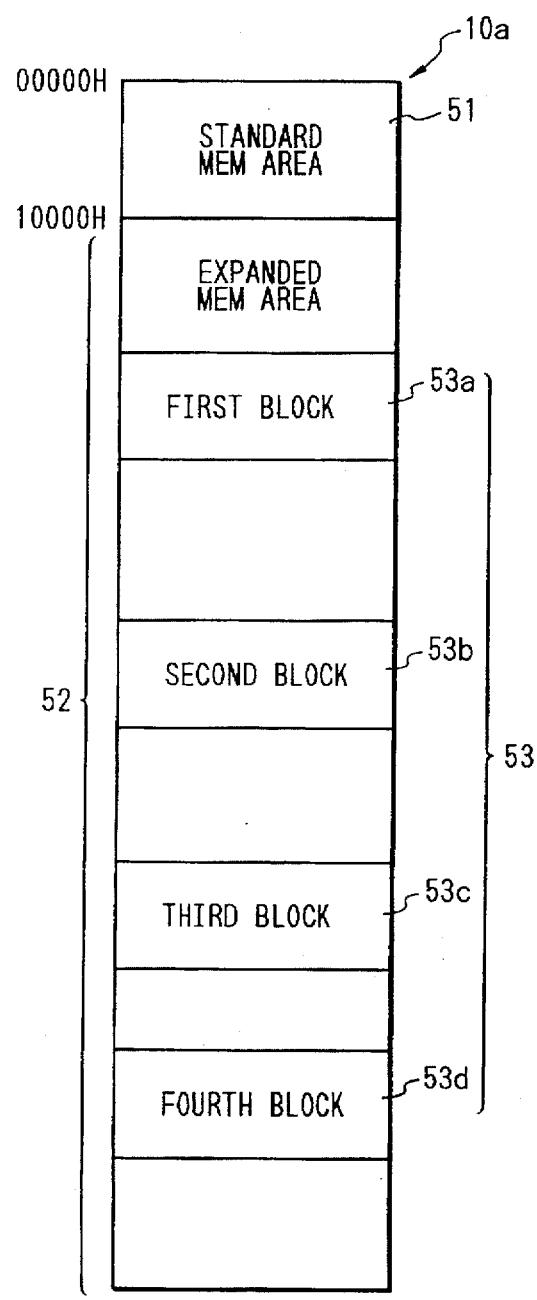
FIGS. 16A and 16B are diagrams showing a memory map of an internal main memory.

More specifically, FIG. 16A is a memory map showing the memory areas in the internal main memory 10. As is shown in FIG. 16A, the fixed memory 10a is divided into the standard memory area 51 that can be accessed in a virtual 8086 mode (a 80386 processor by Intel Corp., etc.), and the expanded memory area 52 (for example, a memory size of 7 MB) that can not be accessed in the virtual 8086 mode in order to permit the employment of an EMS 54 (Expanded Memory System), which is divided and managed by an EMM (Expanded Memory Manager). Further, first through fourth memory blocks 53a through 53d (for example, a memory size of 6 KB) are provided in the space in the expanded memory area 52.

Figure 16B:
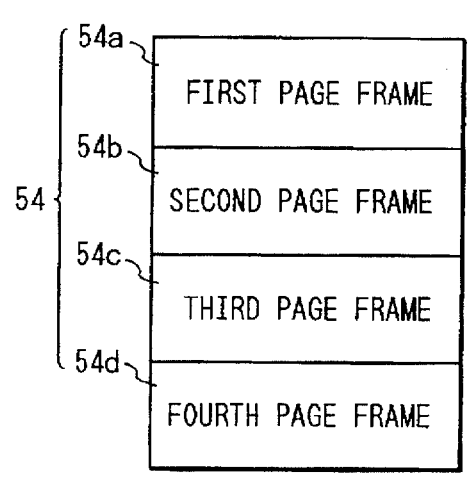

The EMS 54 is constituted by first through fourth page frames 54a through 54d, each of which has a memory size of, for example, 16 KB, as is shown in FIG. 16B. The first through the fourth page frames 54a through 54d are allocated to the first through the fourth memory blocks 53a through 53d. The first through the fourth page frames 54a through 54d can be employed for the performance of data input and output relative to the first through the fourth memory blocks 53a through 53d.

Figure 17:
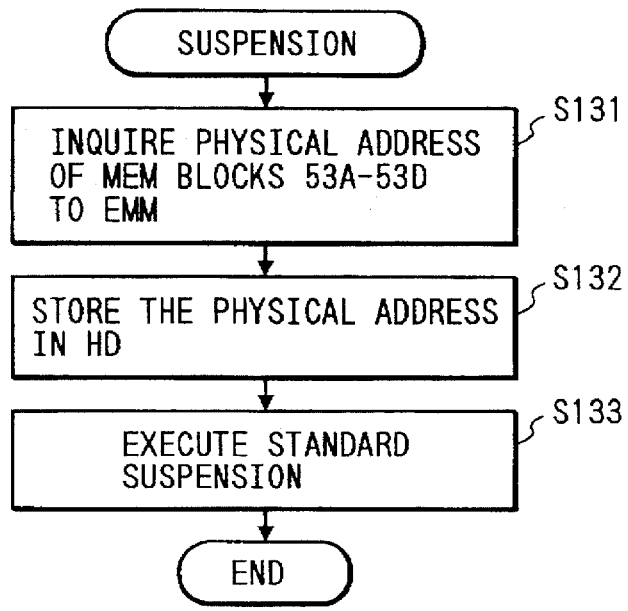
FIG. 17 is a flowchart showing suspension processing.

FIG. 17 is a flowchart showing the control procedures for the suspension processing. This program is executed when the SUSREQ SMI signal is transmitted from the SUSREQ SMI source register 13c to the main CPU 9.

At step S131, the main CPU 9 queries the EMM to obtain the physical addresses of the first to the fourth memory blocks 53a through 53d that are allocated to the first to the fourth page frames 54a through 54d. Then, the physical addresses of the first through the fourth memory blocks 53a through 53d are stored as environment data on the HD 26a (step S132). The standard suspension process is performed (step S133), and the control is thereafter terminated.

Figure 18:
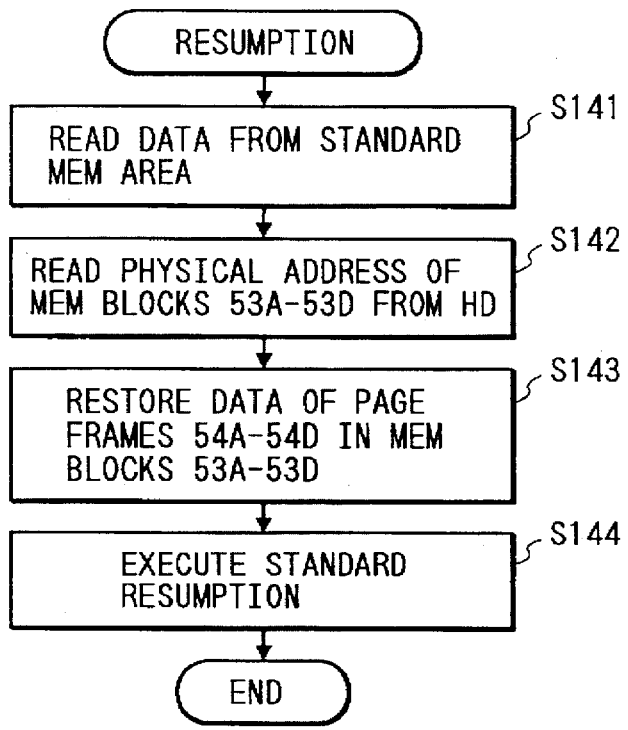
FIG. 18 is a flowchart showing resumption processing.
Figure 19:
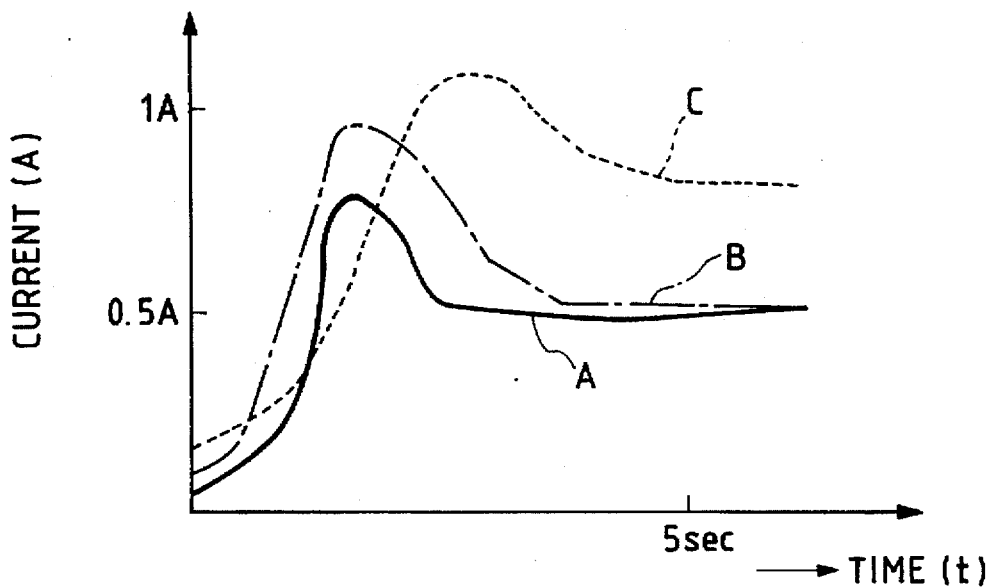
FIG. 19 is a consumed current characteristic graph showing a change in a consumed current from the halted state of a hard disk (HD) until it has reached the operational state.
Figure 20:
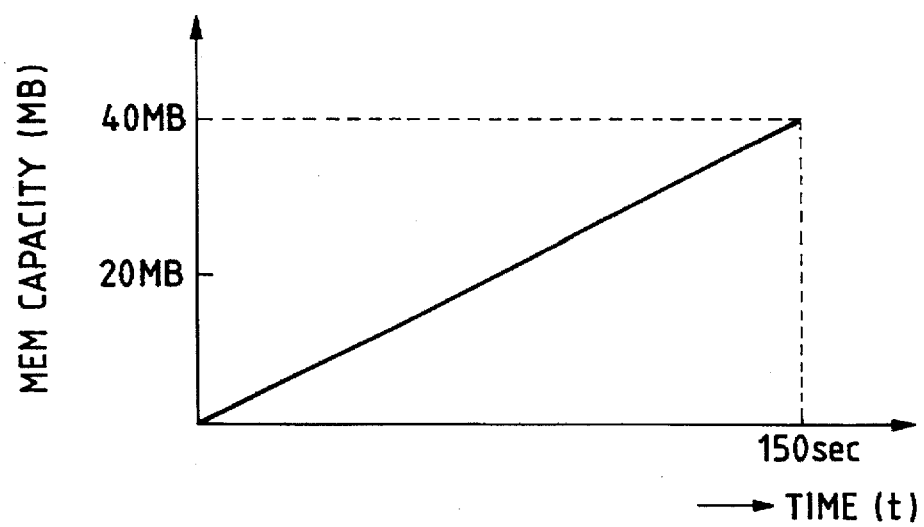
FIG. 20 is a characteristic graph showing a relationship between the time required for suspension processing and a memory size.
Figure 21:
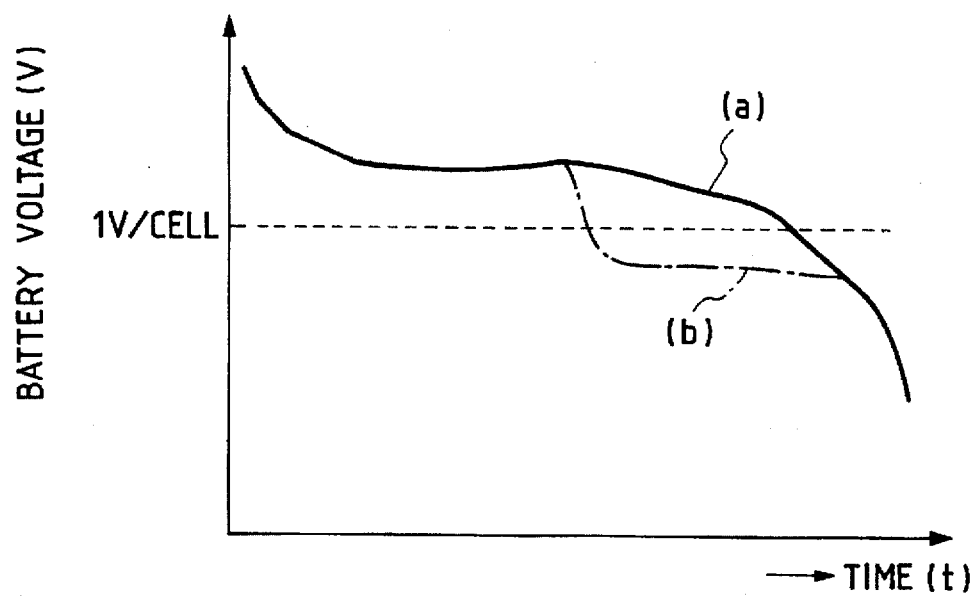
FIG. 21 is a discharge characteristic diagram for explaining a memory effect phenomenon.

FIG. 18 is a flowchart showing the resumption processing, and this program is executed when the 0 V suspension flag is set to "1".

At step S141, the original contents of the standard memory area 51 are read from the HD 26a, and are retrieved and stored in the standard memory area 51. At step S142, according to the environment data that are stored on the HD 26a through the suspension processing, the physical addresses of the first and the fourth memory blocks 53a through 53d, which are allocated to the first through the fourth page frames 54a through 54d, are read out. Then, at step S143, the memory contents that correspond to the first through the fourth page frames 54a through 54d, which are stored on the HD 26a, are retrieved in the first through the fourth memory blocks 53a through 53d. At step S144, the standard resumption processing is performed and the control is thereafter terminated.

In this manner, the process that is performed in the suspended state can be continued during the resumption process. Even when the state is shifted to the idle state due to the continuation of the process, or when an access is performed to a memory that is not retrieved, by retrieving the remaining expanded memory area, all the memories can be retrieved while a user continuously executes the process that is performed in the suspended state.

(Second Embodiment)

Figure 22:
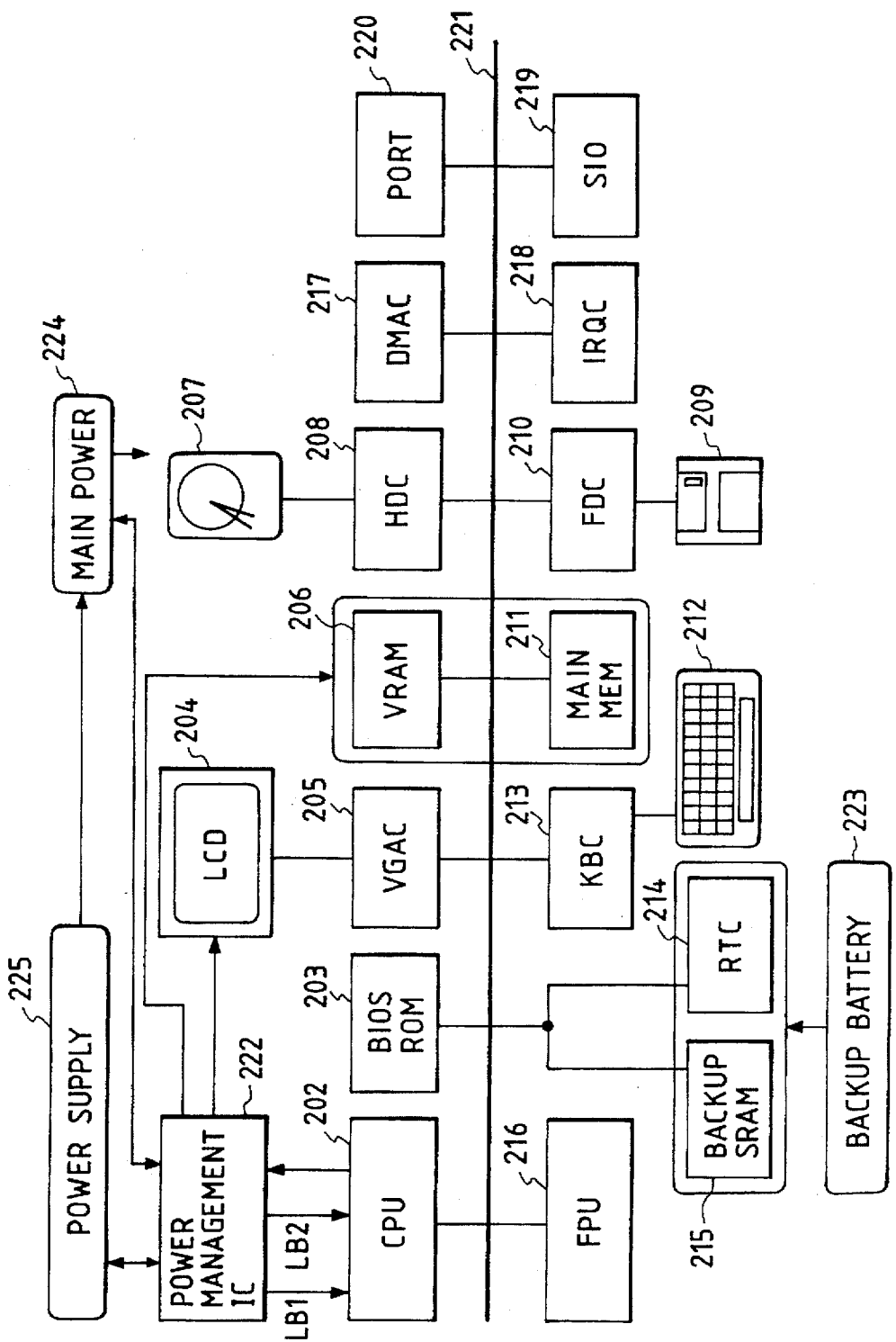
FIG. 22 is a block diagram illustrating the arrangement of a portable information processing apparatus according to a second embodiment of the present invention.

A second embodiment of the present invention will now be explained while referring to the drawings. FIG. 22 is a block diagram illustrating the arrangement of a portable information processing apparatus according to this embodiment.

In FIG. 22, an information processing apparatus 201 comprises a central processing unit (CPU) 202, for main control; a BIOS ROM 203, for storing a control program for the CPU 202; a video graphic array controller (VGAC) 205, for controlling screen display of a liquid crystal display section (LCD) 204; a video memory (VRAM) 206, for storing characters, etc., to be displayed on the liquid crystal display section 204; a hard disk controller (HDC) 208, for controlling a hard disk (HDD) 207 on which is stored an application program, etc.; a floppy disk controller (FDC) 210, for controlling a floppy disk (FDD) 209, on which is stored an application program, etc.; a main memory 211, such as a DRAM, that is used as a working area for the CPU 202; a keyboard controller (KBC) 213, for controlling key input at a keyboard 212; a real time clock (RTC) 214, for preforming time management; a backup SRAM 215, for storing system information concerning the operational state of a system; a floating-point unit (FPU) 216, for supporting the computations by the CPU 202; a DMA controller (DMAC) 217, for controlling fast data transfer; an interrupt request controller (IRQC) 218, for accepting an interrupt request that is input through an I/O port (not shown); and a serial interface (SIO) 219 and an extension port (PORT) 220, for connecting an external processor. These components are mutually connected via a system bus 221. The CPU 220 directly communicates with a power management IC 222 for controlling power supply, and the power management IC 222 is connected to a power supply section 225 that is an AC power supply or a battery pack. A main power 224 for supplying power to the individual sections is connected between the power management IC 222 and the power supply section 225. Further, the backup SRAM 215 and the real time clock 214 are connected to a separate backup battery 223.

By employing an application reading program, one of the control programs stored in the BIOS ROM 203, the CPU 220 reads out application programs, etc., that are stored on the hard disk 207 or on the floppy disk 209. The CPU 220 employs the main memory 211 to execute a program that is read out. The CPU 202 further includes a timer (not shown) that has a free running counter with several channels. The timer manages the time required for the execution of each program.

An LED (not shown) for informing a user of the operational state and for warning of an abnormal state of the apparatus is provided in the liquid crystal display section 204 or on the keyboard 212. In addition, at the keyboard 212 are provided a main power switch for turning on and off the main power 224; a switch for setting a display intensity for the liquid crystal display section 204; and a suspension/resumption select switch for shifting the state to a suspension mode or to a resumption mode, which will be described later.

The DMA controller 217 transfers data without engaging the CPU 202 to perform fast data transfer between memory and memory, between memory and an I/O port, or between an I/O port and an I/O port.

The interrupt controller 218 accepts interrupts from the I/O port and establishes the priority order for the accepted interrupts. The interrupt controller 218 then outputs to the CPU 202 a processing start command that corresponds to an interrupt which is to be executed and that consists of a control signal and a start address for a pertinent block of the control program which is stored in the BIOS ROM 3. The CPU 202 employs the control program that is acquired from the BIOS ROM 203 in consonance with the address data to execute interrupt processing.

The power management IC 222 not only controls the supply of power from the main power 224 to the individual components, but it also monitors a voltage level of the power supply section 225, which will be described later, and outputs the results to the CPU 202 across signal lines LB1 and LB2. Further, according to the control program that is stored in the BIOS ROM 203, the power management IC 222 controls a power supply circuit in consonance with a signal that is output by the CPU 202.

The suspension operation that is to be executed with this arrangement will now be explained. The suspension operation is controlled by the CPU 202 according to the control program that is stored in the BIOS ROM 203.

The information processing apparatus in this embodiment can execute two suspension operations: 5 V suspension and 0 V suspension. Although the supply of power to the main components is halted during the suspension, data in the main memory 211 that are used by the application program that is being executed, data displayed on the LCD 204, and data indicating the use state, such as a count value for the free running counter, must be held in order, at the time of resumption, to perform an orderly recovery of the state that existed immediately before the suspension processing was performed (the data described above are hereafter referred to as "suspension data").

In the 5 V suspension, therefore, power is supplied to memory devices in which the suspension data are stored, and the power supply to the other components is halted. More specifically, power is supplied to the backup SRAM 215 by the backup battery 223 and to the VRAM 206 by the power supply section 225. Further, the main memory 211 is refreshed by the power supply section 225. Thus, during the 5 V suspension processing, data stored in these memory devices can be retained. Power is also supplied to the power management IC 222 by the power supply section 225 to control the supply of power during the resumption processing.

During the resumption processing, the supply of power is restarted to the components for which the power supply was interrupted under the control of the power management IC 222. Then, the execution of an application program that was being executed immediately before the suspension began is continued by the CPU 202.

During the 0 V suspension processing, since the power that is supplied from the power supply section 225 is halted to all the components but the power management IC 222, the suspension data are stored in a suspension data storage area that is acquired in advance in a non-volatile storage device, such as the hard disk 207, to which data can be written.

More specifically, as the suspension data storage area, an area is acquired that is the equivalent in size of a memory that is required for storage and that can hold an amount of data that is determined as the result of testing the system arrangement at the first setup immediately after the apparatus is powered on. The position data for the acquired area are stored in the backup SRAM 215. Upon the receipt of a suspension request signal, the CPU 202 issues a DMA data transfer command to the DMA controller 217, and a DMA data transfer is performed whereby data in the main memory 211, etc., are retired to the suspension data storage area that corresponds to the position data, which is stored in the backup SRAM 215. When the DMA data transfer has been completed, the supply of power to the components, other than the power management IC 222 that controls power during the resumption processing, is halted. Backup power is constantly supplied to the backup SRAM 215 by the backup battery 223.

When the resumption processing is begun, the supply of power to the components is resumed by the power management IC 222. Then, in consonance with the position data that are held in the backup SRAM 215, data that are stored in a predetermined suspension data storage area on the hard disk 207 are again written into the memory wherein the data were stored before the suspension processing was executed. When the data are returned to the original state, the application program that was being executed before the suspension processing began.

Power management in this embodiment will now be described. For power management, there are four relevant system statuses: "power-on", "power-off", "5 V suspended" and "0 V suspended". A current system status, which is stored in the backup SRAM 211, is represented as "1", "2", "3", or "4". As methods for controlling the supply of power for the information processing apparatus, there are a control method whereby the power on/off manipulation is effected by a user turning on and off a power switch or a control method whereby the power on/off manipulation is performed for a user suspension that is effected by a user depressing a suspension/resumption button, and a control method for forced suspension, which will be described later.

The power supply control for the user suspension and for the forced suspension is performed by the power management IC 222. The power management IC 222 detects the type of the power supply section 225 (an AC power supply or a battery pack that consists of nickel-cadmium cells) that is in use and the voltage level of the power supply section 225. The power management IC 222 then outputs across the signal lines LB1 and LB2 a detection signal that is in consonance with the detected voltage level, i.e., a signal that indicates to which area the voltage level belongs: a normal operation area, a low voltage area 1, or a low voltage area 2.

Figure 23:
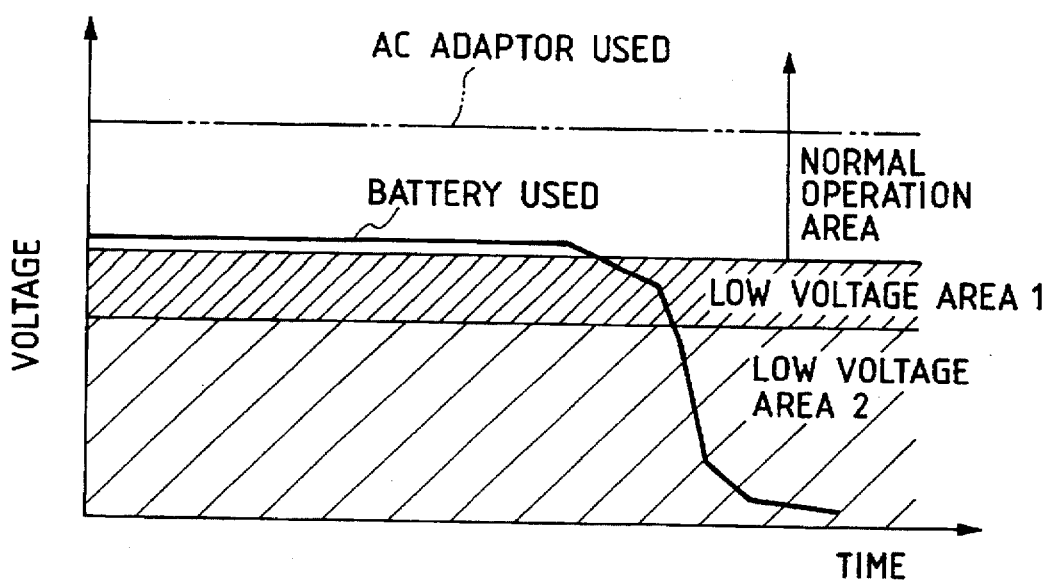
FIG. 23 is a graph showing an example of a voltage level for a power supply section shown in FIG. 22.

More specifically, the power management IC 222 compares a detected voltage level with a voltage level that is set in advance, as is shown in FIG. 23. When the detected voltage level is in the normal operation area, the power management IC 222 outputs a low level detection signal across the signal lines LB1 and LB2. In response to the signal, the CPU 202 acknowledges that the voltage level is in the normal operation area, and executes 5 V suspension when a user suspension request is input by the depression of a suspension switch.

When the detected voltage level is in the low voltage area 1, the power management IC 222 outputs a high level detection signal across the signal line LB1 and a low level detection signal across the signal line LB2. When the voltage level is in the low voltage area 2, the power management IC 222 outputs a high level detection signal across the signal lines LB1 and LB2. Upon the receipt of these signals, the CPU 202 acknowledges that the voltage level is in the low voltage area 1 or is in the low voltage area 2. When a suspension request is received, therefore, the CPU 202 executes the 0 V suspension in which data retention is important, rather than the 5 V suspension in which suspension shifting speed is important. It should be noted that when the voltage level of the power supply section 225 is in the low voltage area 2, normal operation is not warranted.

An explanation will now be given for power management when an AC adaptor is employed as the power supply section 225 of the information processing apparatus that is operated in the above described manner. As is shown in FIG. 23, since the voltage level is within the normal operation area when the AC adaptor is used, a forced suspension is not performed and the state is shifted to the suspended state only by a user suspension.

When a user depresses the suspension/resumption button, the power management IC 222 detects the depression of that button and responds to the user suspension by outputting a suspension request signal to the CPU 202.

As is described above, since the voltage level belongs to the normal operation area when the AC adaptor is used, both detection signals that are output by the power management IC 222 to the signal lines LB1 and LB2 are low-level. Therefore, upon a request for suspension, 5 V suspension is to be selected. In consonance with a control program that is stored in the BIOS ROM 203, the CPU 202 executes 5 V suspension processing, such as the halting of an application that is being executed and the writing of data into a predetermined memory area. In addition, the CPU 202 stores data "3", which indicates the 5 V suspension, as the system status in the backup SRAM 215.

When the process is terminated and the apparatus 201 is in the state where the operation can be stopped, the CPU 202 transmits to the power management IC 222 a request signal for a power supply process for 5 V suspension. In response to this signal, the power management IC 222 continues to supply power to the memory devices, such as itself and the main memory 211, while it halts the supply of power to the other components. In this way, the state of the information processing apparatus 201 is shifted to the suspended state.

An explanation will now be given of power management when a battery pack that consists of, for example, nickel-cadmium cells is employed as the power supply section 225 for the portable information processing apparatus in this embodiment.

Since the voltage level of a battery pack that has sufficient remaining power is within the normal operation area, the state is shifted to the suspended state only when a user suspension is performed in response to the depression of the suspension/resumption button by a user. The operation in this case is the same as that when the AC adaptor is used.

As the operation is continued by the battery pack, the voltage level falls from the normal operation area to the low voltage area 1 due to the reduction in the remaining battery power. At this time, the power management IC 222 transmits to the CPU 202 a high level detection signal across the signal line LB1 and a low level detection signal across the signal line LB2. Although normal operation can be performed in the low voltage area 1, a warning is displayed by using an LED, etc., to inform a user of the lower remaining battery power.

When the suspension button is depressed by the user under this condition, the power management IC 222 detects it and responds to a user suspension command by transmitting a suspension request signal to the CPU 202.

When the voltage level is within the low voltage area 1, a 0 V suspension is to be executed. More specifically, according to the control program in the BIOS ROM 203, the CPU 202 halts the application that is being executed and writes data to a predetermined memory area. Then, the CPU 202 executes a DMA data transfer in which suspension data stored in the main memory 211, the VRAM 206, etc., are retired into a continuous suspension data storage area "A" on the hard disk 207. Thus, the suspension data can be completely retained regardless of the power supply state. In addition, the CPU 202 stores in the backup SRAM 215 suspension data that are acquired during the 0 V suspension processing, i.e., data "4", as the system status.

When the process is terminated and the apparatus 201 is in the state where the operation can be stopped, the CPU 202 transmits to the power management IC 222 a request signal for a power supply process for a 0 V suspension. In response to this signal, the power management IC 222 halts the supply of power from the power supply section 225 to components other than the power management IC 222. In this way, the state of the information processing apparatus 201 is shifted to the 0 V suspended state.

Since power is supplied to the power management IC 222 even in the 0 V suspended state, when the power management IC 222 detects that the suspension/resumption button is again depressed by a user, it can recover the power supply system and resume the supply of power. With power supplied, the CPU 202 resumes the operation. In consonance with a power-on program in the BIOS ROM 215 that is employed as the control program, the CPU 202 scans the backup SRAM 215 and reads system status "4" and the position data for the suspension data storage area. By referring to the read suspension data, the CPU 202 determines that the operational state of the apparatus will be recovered from the 0 V suspended state and that the suspension data that are required for such recovery are stored in data storage area "A". The BIOS ROM 203 employs the relevant data and begins to transfer data from the area "A" to the main memory 211. When the data transfer is terminated, the state of the apparatus 201 has been recovered to the normal operation mode, and data "1", indicating that the apparatus 201 is in the power-on state, is written as the system status into the backup SRAM 215. The resumption process is thereafter terminated.

When the battery pack is continuously used after the voltage level has fallen to the low voltage area 1, the voltage level then falls to the low voltage area 2, due to the reduction in the remaining battery power. Normal operation is not warranted in this area. The signals that are transmitted from the power management IC 222 to the CPU 202 across the signal lines LB1 and LB2 are both high level. Upon the receipt of these signals, the CPU 202 halts the application that is being executed and executes forced suspension processing.

Since the voltage level is within the low voltage area 2 at the time of the execution of the forced suspension, the above described 0 V suspension is performed.

The selection of the above described suspension processing and its operation procedures will now be explained while referring to the flowchart in FIG. 24.

First, at step S1, the CPU 202 determines to which area a voltage level that is detected by the power management IC 222 belongs: the normal operation area, the low voltage area 1, or the low voltage area 2. When the voltage level is in the normal operation area, at step S2, 5 V suspension is selected. When the voltage level is in the low voltage area 1, at step S3, a warning is given to a user by an LCD, and at step S4, 0 V suspension is selected. When, at steps S2 and S4, the suspension is selected, at step S5, the power management IC 222 determines whether or not the suspension button has been depressed. When the decision at step S5 is NO, program control returns to step S1 and the process at steps S1 through S5 is repeated. When the decision at step S5 is YES, program control moves to step S7 where the power management IC 222 transmits a suspension request signal to the CPU 202 (user suspension).

When, at step S1, the voltage level is in the low voltage area 2, at step S6, 0 V suspension is selected, and at step S7, the power management IC 222 transmits a suspension request signal to the CPU 202 (forced suspension).

After the suspension request signal is output, suspension processing, such as the halting of a currently executing application and data writing to a predetermined memory, is performed (step S8). Then, at step S9, a suspension power supply request signal is transmitted to the power management IC 222, which in turn halts the power supply.

Even when an AC adaptor output voltage drops due to some error during the use of the AC adaptor, 0 V suspension is of course selected.

As is described above, according to the second embodiment, the suspension system is automatically selected in consonance with the voltage level. That is, when the voltage level is in the normal operation area, the 5 V suspension where suspension shifting speed is important is selected, and when the voltage level is in the low voltage area, the 0 V suspension where data retention is important is selected. Compared with a conventional portable information processing apparatus, the optimal suspension for the state of the apparatus can be executed. Thus, the stability and reliability of data retention can be increased.

(Third Embodiment)

A third embodiment of the present invention will now be explained.

In this embodiment as well as in the second embodiment, the suspension is automatically controlled in consonance with the voltage level of a power supply section 225: when the voltage level is in the normal operation area, 5 V suspension is performed, and when the voltage level is in the low voltage area 1 or 2, 0 V suspension is performed. However, when suspension data are retired to a hard disk 207, etc., in the 0 V suspension, a continuous memory area must be acquired that is equivalent in size to the amount of the suspension data must be acquired.

An information processing apparatus according to this embodiment employs the CPU 202 in the second embodiment that further comprises a function (hereafter referred to a disk check program) for selecting 5 V suspension when a continuous empty area can not be found in a non-volatile storage device, such as the hard disk 207.

The suspension processing in this embodiment will now be explained while referring to the flowchart in FIG. 25.

Figure 24:
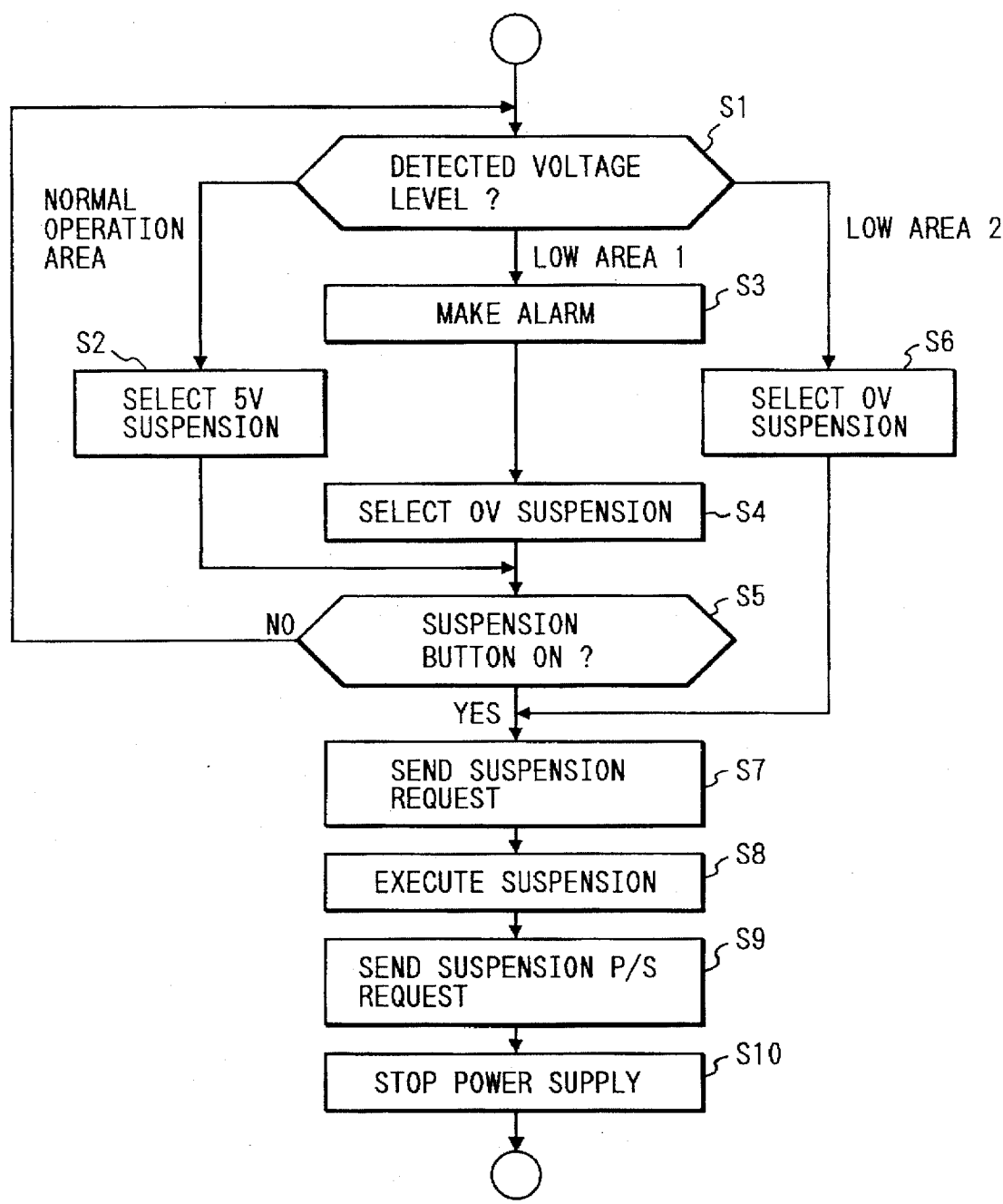
FIG. 24 is a flowchart for explaining the selection of suspension processing and the procedures for the suspension processing.
Figure 25:
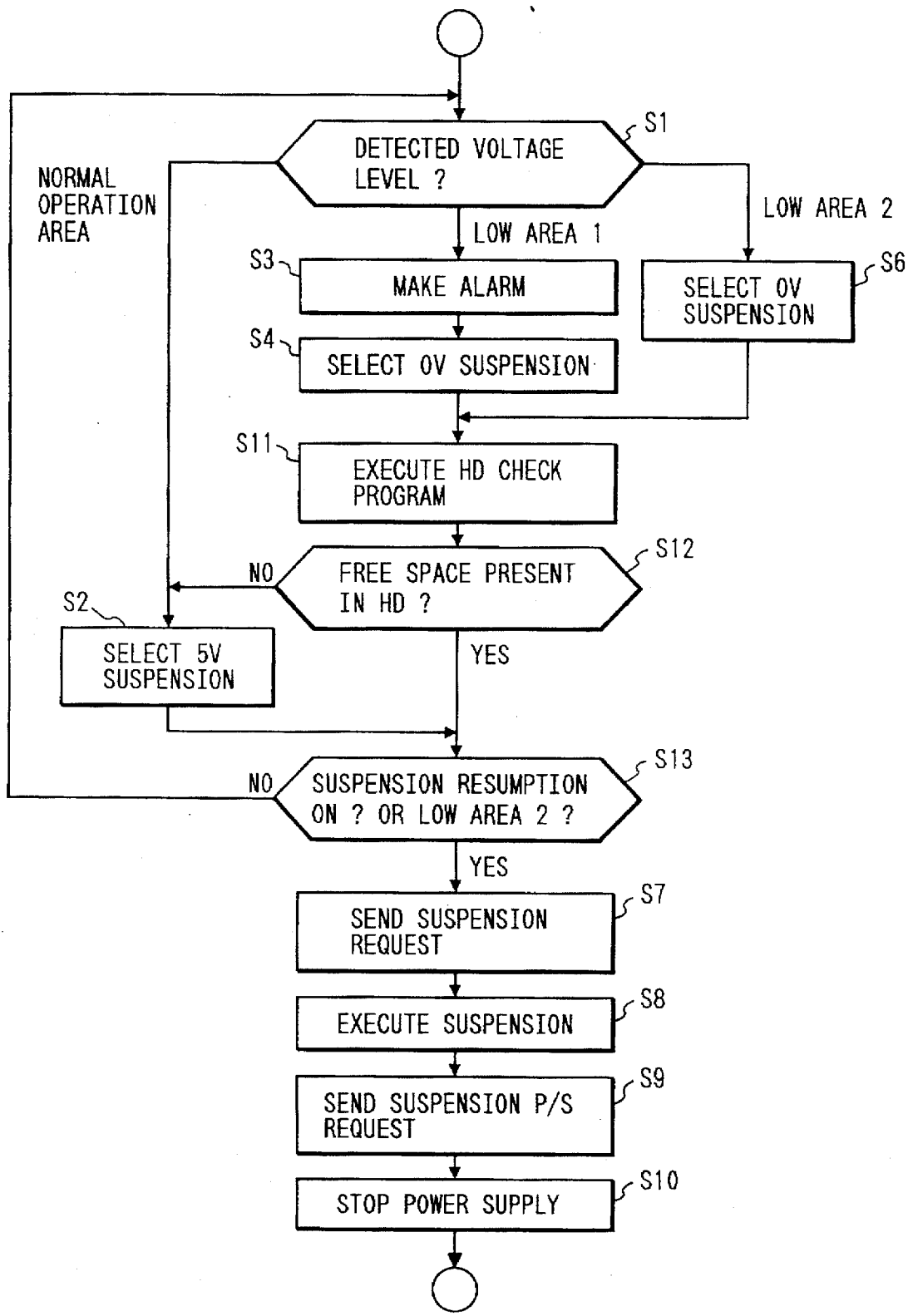
FIG. 25 is a flowchart for explaining the selection of suspension processing and the procedures for the suspension processing that are executed by a portable information processing apparatus according to a third embodiment of the present invention.

In FIG. 25, the processes at steps S1 through S4 and S6 are the same as those at steps S1 through S4 and S6 shown in FIG. 24 for the second embodiment.

When 0 V suspension is selected at step S4 or S6, a disk check program is executed at step S11. More specifically, the CPU 202 detects the capacity of the main memory 11, and adds this value to a memory amount in the VRAM 206 and in the CPU 202 that is the equivalent of the register data. The CPU 202 employs the resultant value as an expected value and scans the hard disk 207 for a continuous area that is equivalent in size to the expected value. As a result, when, at step S12, it is determined that there is a continuous area, a DMA data transfer can be performed, and thus program control advances to step S13. If, at step S12, it is found that such a continuous area can not be obtained because of the shortage of empty areas, program control goes to step S2. The control is switched to the execution of 5 V suspension and program control goes to step S13.

At step S13, a check is performed to determine whether or not a user has depressed a suspension/resumption button, or whether or not the voltage level has fallen to the low voltage area 2. If the decision is NO, program control returns to step S1, and the above described processes are repeated. If the decision is YES, the procedures at steps S7 through S10 are performed. Since these procedures are identical to those at steps S7 through S10 in FIG. 24 for the second embodiment, an explanation for them will not be given.

As is described above, according to the present invention, when a continuous empty area can not be found in a non-volatile storage device, such as on a hard disk, and 0 V suspension can not therefore be performed, the system is so controlled that it executes a 5 V suspension. Thus, an appropriate suspension can be selected in consonance with the operational state of the apparatus.

(Fourth Embodiment)

Figure 26:
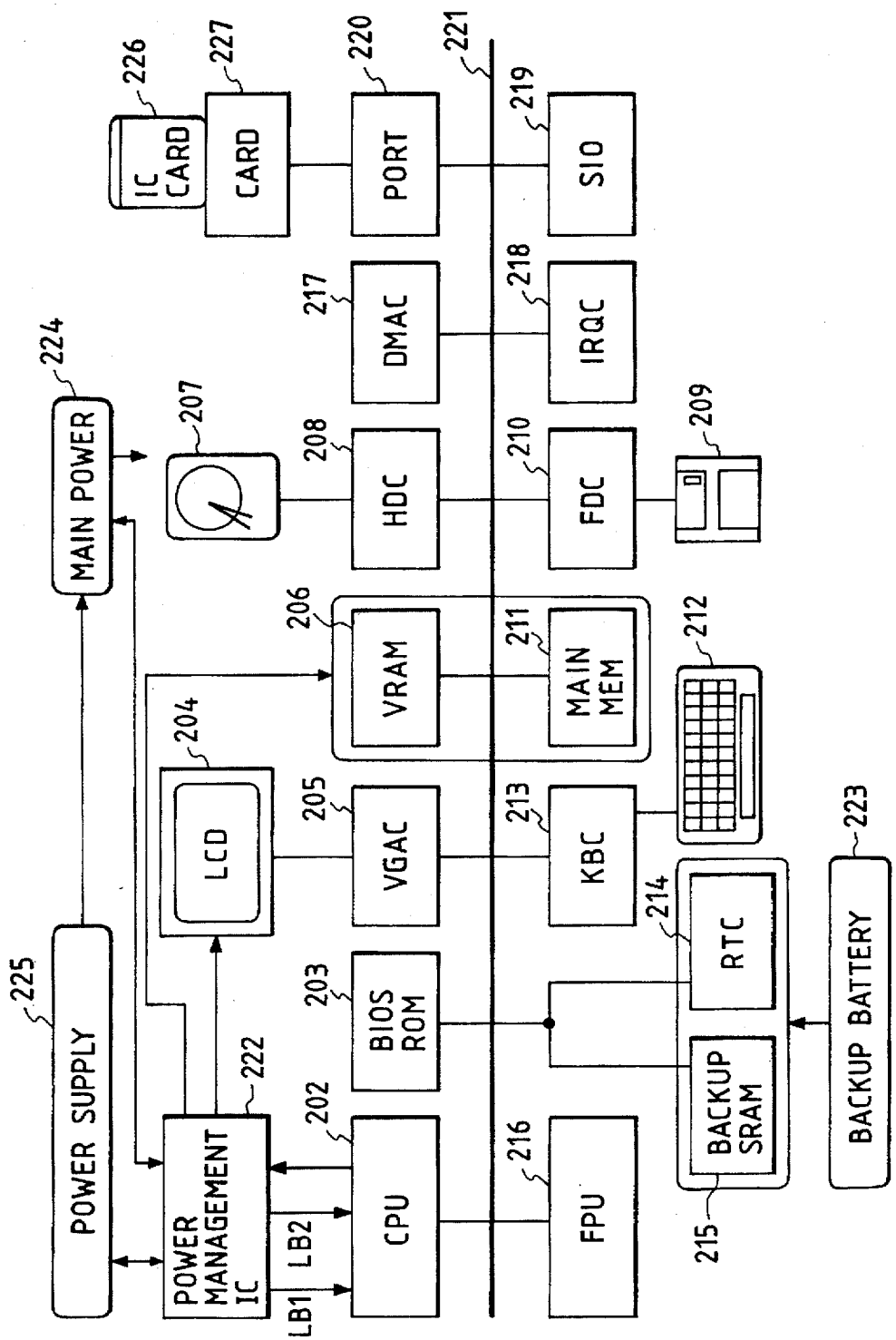
FIG. 26 is a block diagram illustrating the arrangement of a portable information processing apparatus according to a fourth embodiment of the present invention.

A fourth embodiment of the present invention will now be described while referring to FIG. 26. FIG. 26 is a block diagram illustrating the arrangement of a portable information processing apparatus according to the fourth embodiment.

In the arrangement for this embodiment, an IC card controller 227 is additionally provided for the arrangement in FIG. 22 for the second embodiment. An IC card 226 that is a non-volatile semiconductor memory, such as a flash memory, is connected to the IC card controller 227, which serves as a peripheral device for the information processing apparatus. Since the other components are the same as those in FIG. 22, the same reference numbers as are used in FIG. 22 are also used to denote these components, and a detailed explanation of them will not be given.

With the above arrangement, when the IC card 226 is connected, during the detection of the individual components of the information processing apparatus that is performed at the initial setup immediately after the apparatus is powered on, not only the memory sizes of the components and data concerning the types but also the use of the IC card 226 is detected.

When the IC card 226 is detected at the time of the initial setup, a disk check program is executed that determines whether or not a continuous area in which suspension data can be retired in the suspended state can be acquired in the semiconductor memory of the IC card 226. More specifically, first, the memory capacity of the main memory 211 is detected, and the detected value is added to a memory amount for register data in a VRAM 206 and in a CPU 202. The resultant value is employed as an expected value to scan the semiconductor memory for a continuous area that is equivalent in size to the expected value. As a result, when it is determined that a continuous area is present, the information that the IC card 226 can be used as a suspension data storage area is stored in a backup SRAM 215. When a flash memory card is used as the IC card 226, after the detection of the IC card 226 at the initial setup, information that an area can be obtained on the card is stored as system data in the backup SRAM 215.

With the above arrangement, suspension operation when a voltage level is in low voltage area 1 or 2 will be explained.

When a voltage level is in the low voltage area 1 and a suspension request is issued by a user, and when the voltage level falls to the low voltage area 2, the CPU 202 halts the currently executed application and writes various data into predetermined memory areas according to a control program that is stored in a BIOS ROM 203.

When the data writing is completed, the CPU 202 executes a disk check program with a control program in the BIOS ROM 203. More specifically, first, the CPU 202 detects the memory size of a main memory 211 and adds the detected memory size to a memory amount for register data in the VRAM 206 and in the CPU 202. The CPU 202 employs the resultant value as an expected value and scans the data stored in the backup SRAM 215 to determine whether or not a continuous area that is equivalent in size to the expected value can be obtained. As a result, when it is determined that a continuous area is present, the CPU 202 determines whether or not a semiconductor memory is included in that area. When the continuous area in consonance with the expected value is present in the semiconductor memory, the CPU 202 allocates that area as a first data transfer area, and executes a DMA data transfer. In addition, the CPU 202 stores in the backup SRAM 215 suspension data for a 0 V suspension, i.e., data "4", as the system status.

As is described above, when a 0 V suspension is performed while a non-volatile semiconductor memory, such as an IC card consisting of a flash memory, in which data can be written is present, priority is given to the use of that non-volatile semiconductor memory as a suspension data storage area, rather than to the use of a non-volatile memory, such as a hard disk, to which data can be written. Wasteful power consumption due to the electric driving of mechanical units, such as for the disk rotation of the hard disk, can be reduced, and power can be saved.

The present invention can of course be applied for desktop information processing apparatuses, in addition to the portable information processing apparatuses referred to in the first through the fourth embodiments.

What is claimed is:

1. An information processing apparatus comprising:

a battery for supplying power to a device that requires power;

first storage means for retaining data in a power supplied state;

second storage means for retaining data in a non-power supplied state and in the power supplied state;

transfer means for transferring the data stored in said first storage means to said second storage means while power is supplied;

first prediction means for predicting a processing time required by said transfer means to transfer the data to said second storage means;

second prediction means for predicting a power characteristic for said second storage means;

remaining power detection means, for detecting a remaining power level for said battery, that includes reference value setting means for setting a first predetermined value in accordance with results obtained by said first and said second prediction means; and power supply halting means for, when said remaining power detection means determines that said remaining power level for said battery is lower than a first predetermined reference value, halting a supply of power to the device upon completion of the transfer of the data by said transfer means.

2. An information processing apparatus according to claim 1, further comprising program storing means storing program codes to control a basic input/output system for said information processing apparatus, wherein said basic input/output system includes first prediction execution means for operating said first prediction means and execution enabling means for enabling the operation of said second prediction means when remaining battery power is equal to or greater than a second predetermined reference value, which is greater than said first predetermined reference value.

3. An information processing apparatus according to claim 1 or 2, wherein said first prediction means predicts said processing time based on an attribute of at least one control system component that is incorporated into said apparatus.

4. An information processing apparatus according to claim 3, wherein said attribute of said control system component includes at least computation processing speed for first control means that controls the entire apparatus, a memory capacity of said first storage means, and a memory capacity of said second storage means.

5. An information processing apparatus according to claim 1 or 2, wherein said second prediction means predicts said power characteristic based on a current peak value and an average current value of said second storage means when said second storage means is driven.

6. An information processing apparatus according to claim 1 or 2, wherein said first storage means includes a detachable expanded module.

7. An information processing apparatus according to claim 1 or 2, further comprising:
first control means for controlling said information processing apparatus;
second control means for controlling the supply of power to said first control means; and
interrupt signal supplying means for controlling an input and output group that includes at least said second storage means, and for transmitting an interrupt signal to said first control means.

8. An information processing apparatus according to claim 7, wherein said first prediction means is driven by said first control means.

9. An information processing apparatus according to claim 7, wherein said second prediction means is driven by said second control means.

10. An information processing apparatus comprising:
a battery for supplying power to a device that requires power;
first storage means, for retaining data in a power supplied state, that includes expanded memory areas that are acquired by dividing available space into a plurality of blocks and an expanded memory system that has a plurality of page frames that are assigned to said plurality of blocks, and that further includes expanded memory management means for managing correspondence between said plurality of blocks of said expanded memory areas and said plurality of page frames of said expanded memory system;
second storage means for retaining data in a non-power supplied state and in the power supplied state;
transfer means for transferring the data stored in said first storage means to said second storage means while power is supplied;
remaining power detection means for detecting a remaining power of said battery; and
power supply halting means for, when said remaining power detection means determines that said remaining power level of said battery is lower than a first predetermined reference value, halting a supply of power to the device upon completion of the transfer of the data by said transfer means.

11. An information processing apparatus according to claim 10, further comprising holding means for holding as environment information in said second storage means addresses of said blocks in said expanded storage area.

12. An information processing apparatus according to claim 11, further comprising first retrieval means for performing priority transfer, to said first storage means, of information for said blocks held by said holding means and for retrieving said information.

13. An information processing apparatus according to claim 12, further comprising second retrieval means for, after said information is retrieved from said first storage means by said first retrieval means, transferring to said first storage means any remaining information in said second storage means that is not retrieved by said first retrieval means and for retrieving the remaining information.

14. An information processing apparatus according to claim 13, wherein, when power is supplied to said second storage means, said second retrieval means transfers, to said first storage means, the remaining information in said second storage means that is not retrieved, and retrieves the remaining information.

15. An information processing apparatus according to claim 13, wherein, when an access to said second storage means is performed, said retrieval means transfers, to said first storage means, the remaining information in said second storage means that is not retrieved and retrieves the remaining information.

16. An information processing apparatus, which retains suspension data indicating a state in use immediately before said information processing apparatus is powered off, comprising:
power supply means for supplying power;
volatile storage means for storing data in a power supplied state;
non-volatile storage means for storing data in a non-power supplied state and in the power supplied state;
0 V suspension means for storing the suspension data in said non-volatile storage means and for performing a 0 V suspension process by which are turned off all power sources of said information processing apparatus;
active suspension means for storing the suspension data in said volatile storage means and for performing an active suspension process by which are turned off power sources of said information processing apparatus, excluding a power source that supplies power to said volatile storage means; and
selection means for selecting said 0 V suspension process when a voltage level of the power supplied by said power supply means is lower than a predetermined value, and for selecting said active suspension process when said voltage level is higher than said predetermined level.

17. An information processing apparatus according to claim 16, further comprising error determination means for determining whether or not an error is occurring in said non-volatile storage means, wherein, when an error occurs in said non-volatile storage means, said selection means selects said active suspension process, even when said voltage level of the power supplied by said power supply means is lower than said predetermined value.

18. An information processing apparatus according to claim 16 or 17, further comprising memory presence determination means for determining whether or not a non-volatile semiconductor memory is included with said non-volatile storage means, wherein, when said non-volatile semiconductor memory is included, said 0 V suspension means is capable of storing the suspension data first in said non-volatile semiconductor memory.

19. An information processing method comprising the steps of:
   supplying power, by means of a battery, to a device that requires power;
   retaining, in a first storage means, data in a power supplied state;
   retaining, in a second storage means, data in a non-power supplied state and in the power supplied state;
   transferring the data stored in the first storage means to the second storage means while power is supplied;
   predicting a processing time required to perform said transferring step;
   predicting a power characteristic for the second storage means;
   detecting a remaining power level for the battery, that uses a reference value setting means for setting a first predetermined value in accordance with results obtained in said predicting steps; and
   when it is detected in said remaining power detecting step that the remaining power level for the battery is lower than a first predetermined reference value, halting a supply of power to the device upon completion of the transfer of the data.

20. An information processing method according to claim 19, further comprising the step of storing program codes to control a basic input/output system for an information processing apparatus in which said method is being performed, wherein the basic input/output system includes means for performing said step of predicting the transfer time, and enables performance of said step of predicting the power characteristic when remaining battery power is equal to or greater than a second predetermined reference value, which is greater than the first predetermined reference value.

21. An information processing method according to claim 19 or 20, wherein said step of predicting the transfer time is performed based on an attribute of at least one control system component that is incorporated into the apparatus in which said method is performed.

22. An information processing method according to claim 21, wherein the attribute includes at least computation processing speed for a first control means that controls the entire apparatus, a memory capacity of the first storage means, and a memory capacity of the second storage means.

23. An information processing method according to claim 19 or 20, wherein said step of predicting the power characteristic is performed based on a current peak value and an average current value of the second storage means when the second storage means is driven.

24. An information processing method according to claim 19 or 20, wherein the first storage means includes a detachable expanded module.

25. An information processing method according to claim 19 or 20, further comprising the steps of:
   controlling the apparatus in which said information processing method is performed, using a first control means;
   controlling the supply of power to the first control means, using a second control means; and
   controlling an input and output group that includes at least the second storage means, and for transmitting an interrupt signal to the first control means.

26. An information processing method according to claim 25, wherein said step of predicting the transfer time is driven by the first control means.

27. An information processing method according to claim 25, wherein said step of predicting the power characteristic is driven by the second control means.

28. An information processing method comprising the steps of:
   supplying power, using a battery, to a device that requires power;
   retaining data in a power supplied state, the data being retained in a first storage means that includes expanded memory areas that are acquired by dividing available space into a plurality of blocks and an expanded memory system that has a plurality of page frames that are assigned to said plurality of blocks, and that further includes expanded memory management means for managing correspondence between the plurality of blocks of the expanded memory areas and the plurality of page frames of the expanded memory system;
   retaining, in a second storage means, data in a non-power supplied state and in the power supplied state;
   transferring the data stored in the first storage means to the second storage means while power is supplied;
   detecting a remaining power level of the battery; and
   when it is determined in said detecting step that the remaining power level of the battery is lower than a first predetermined reference value, halting a supply of power to the device upon completion of the transfer of the data.

29. An information processing method according to claim 28, further comprising the step of holding as environment information in the second storage means addresses of the blocks in the expanded storage area.

30. An information processing method according to claim 29, further comprising the step of performing priority transfer, to the first storage means, of information for the blocks held in said holding step and for retrieving the information.

31. An information processing method according to claim 30, further comprising the step of, after the information is retrieved from the first storage means, transferring to the first storage means any remaining information in the second storage means that has not yet been retrieved, and retrieving the remaining information.

32. An information processing method according to claim 31, wherein, when power is supplied to the second storage means, the remaining information in the second storage means that has not yet been retrieved, is transferred to the first storage means, and the remaining information is retrieved.

33. An information processing method according to claim 31, wherein, when an access to the second storage means is performed, the remaining information in the second storage means that has not yet been retrieved, is transferred to the first storage means, and the remaining information is retrieved.

34. An information processing method which retains suspension data indicating a state in use immediately before an apparatus in which said information processing method is performed, is powered off, comprising the steps of:
   supplying power;
   storing, in a volatile storage means, data in a power supplied state;
   storing, in a non-volatile storage means, data in a non-power supplied state and in the power supplied state;

storing the suspension data in the non-volatile storage means and performing a 0 V suspension process by which are turned off all power sources of the information processing apparatus;

storing the suspension data in the volatile storage means and performing an active suspension process by which are turned off power sources of the information processing apparatus, excluding a power source that supplies power to the volatile storage means; and selecting said 0 V suspension process when a voltage level of the power supplied in said power supplying step is lower than a predetermined value, and selecting said active suspension process when the voltage level is higher than said predetermined level.

35. An information processing method according to claim 34, further comprising the step of determining whether or not an error is occurring in the non-volatile storage means, wherein, when an error occurs in the non-volatile storage means, said selecting step selects said active suspension process, even when said voltage level of the power supplied in said power supplying step is lower than said predetermined value.

36. An information processing method according to claim 34 or 35, further comprising the step of determining whether or not a non-volatile semiconductor memory is included with the non-volatile storage means, wherein, when the non-volatile semiconductor memory is included, the suspension data is capable of storing first in the non-volatile semiconductor memory.

* * * * *